United States Patent
Ma et al.

(10) Patent No.: US 9,489,213 B2
(45) Date of Patent: Nov. 8, 2016

(54) SHUTDOWN METHOD, STARTUP METHOD, AND COMMUNICATION TERMINAL

(71) Applicant: Huawei Technologies Co., Ltd., Shenzhen, Guangdong (CN)

(72) Inventors: Tao Ma, Shanghai (CN); Jingjing Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 163 days.

(21) Appl. No.: 14/282,682

(22) Filed: May 20, 2014

(65) Prior Publication Data

US 2014/0344620 A1    Nov. 20, 2014

(30) Foreign Application Priority Data

May 20, 2013  (CN) .......................... 2013 1 0187462

(51) Int. Cl.
  *G06F 11/00*  (2006.01)
  *G06F 9/44*   (2006.01)
  *G06F 11/14*  (2006.01)

(52) U.S. Cl.
  CPC ........... *G06F 9/442* (2013.01); *G06F 11/1441* (2013.01)

(58) Field of Classification Search
  CPC .............. G06F 9/442; G06F 11/1417; G06F 11/1438; G06F 11/1441
  See application file for complete search history.

(56) References Cited

U.S. PATENT DOCUMENTS

| | | | | |
|---|---|---|---|---|
| 5,710,930 A * | 1/1998 | Laney | .................... | G06F 9/4418 710/10 |
| 7,529,921 B2 * | 5/2009 | Stein | ....................... | G06F 9/441 713/1 |
| 9,032,194 B2 * | 5/2015 | Iyigun | ..................... | G06F 9/442 713/1 |
| 9,158,475 B2 * | 10/2015 | Ryu | ..................... | G06F 13/1694 |
| 2006/0069853 A1 * | 3/2006 | Beckert | ............... | G06F 11/1441 711/104 |
| 2006/0242398 A1 * | 10/2006 | Fontijn | ................. | G06F 9/4406 713/2 |
| 2006/0282654 A1 * | 12/2006 | Veen | ..................... | G06F 21/575 713/1 |
| 2008/0082812 A1 | 4/2008 | Kirshenbaum et al. | | |
| 2009/0124244 A1 | 5/2009 | Mao | | |
| 2009/0172439 A1 * | 7/2009 | Cooper | ................. | G06F 1/3203 713/323 |
| 2010/0064126 A1 * | 3/2010 | Yi | ......................... | G06F 9/4418 713/2 |

(Continued)

FOREIGN PATENT DOCUMENTS

| CN | 1530796 A | 9/2004 |
|---|---|---|
| CN | 1584826 A | 2/2005 |
| CN | 101141723 A | 3/2008 |

(Continued)

OTHER PUBLICATIONS

Static random-access memory, retrieved from Wayback Machine capture dated May 15, 2012, Wikipedia, entire document.*

*Primary Examiner* — Marc Duncan
(74) *Attorney, Agent, or Firm* — Leydig, Voit & Mayer, Ltd.

(57) ABSTRACT

The present invention relates to the field of computers and communications, and discloses a shutdown method, a startup method, and a communication terminal. The startup method includes: receiving a startup signal, where the startup signal is used to trigger a terminal to perform a startup; supplying power to components of the terminal; starting the terminal according to a first startup mode; and if the startup according to the first startup mode fails, performing a startup according to a second startup mode. The technical solution is applied to help to increase the startup speed when the terminal is powered on and started.

14 Claims, 10 Drawing Sheets

(56) References Cited

U.S. PATENT DOCUMENTS

2012/0144179 A1* 6/2012 Iyigun .................... G06F 9/442
                                                                713/2
2015/0323983 A1* 11/2015 Hobson ................ G06F 1/3203
                                                              713/323

FOREIGN PATENT DOCUMENTS

| CN | 101437072 A | 5/2009 |
| CN | 101931696 A | 12/2010 |
| CN | 102624976 A | 8/2012 |

* cited by examiner

SHUTDOWN METHOD, STARTUP METHOD, AND COMMUNICATION TERMINAL

CROSS-REFERENCE TO RELATED APPLICATION

This application claims priority to Chinese Patent Application No. 201310187462.4, filed on May 20, 2013, which is hereby incorporated by reference in its entirety.

TECHNICAL FIELD

The present invention relates to the field of computers and communications, and in particular, to a shutdown method, a startup method, and a communication terminal.

BACKGROUND

With the development of communications technologies and computer technologies, functions of communication terminals (such as mobile phones) are stronger and stronger, and systems are also more and more complicated.

An existing single processor already cannot satisfy system requirements of an existing intelligent communication terminal More and more intelligent communications systems use a multi-processor technology.

From the perspective of transaction processing of an intelligent terminal, processors may be classified into an application processor (also described as application CPU), and a communication processor (also described as communication CPU, or modem CPU). The application processor mainly completes functions such as man-machine interface interaction, application running of a user, and protocol stack running and processing of a network application protocol (for example, including but not limited to Transmission Control Protocol/Internet Protocol (TCP/IP)). The communication processor is connected to a subscriber identity module (SIM for short), and uses the SIM card to complete communication procedure processing and complete functions of managing communication user data and communication procedure control.

From the perspective of control of the intelligent terminal, processors may be classified into a communication processor and an application processor. The communication processor is mainly used to trigger each application processor to work and complete a startup (Boot) and startup security check. The application processor is mainly used to trigger each application processor to work and complete a startup (Boot) and startup security check. The application processor completes specific processing transactions under control of the communication processor.

However, the prior art has at least the following disadvantages:

As the intelligent terminal system is more and more complex, the startup time of the communication terminal is also longer and longer. Therefore, a user always needs to wait for a long time to apply software of the terminal or use the terminal for communication.

SUMMARY

A first objective of embodiments of the present invention is to provide a shutdown method, where the technical solution is applied to help to increase the startup speed when a terminal is powered on and started.

A second objective of embodiments of the present invention is to provide a first startup method for a communication terminal, where the technical solution is applied to help to increase the startup speed when a terminal is powered on and started.

A third objective of embodiments of the present invention is to provide a second startup method for a communication terminal, a communication terminal, and a computer system, where the technical solution is applied to help to increase the startup speed when a terminal is powered on and started.

A fourth objective of embodiments of the present invention is to provide a communication terminal, where the technical solution is applied to help to increase the startup speed when a terminal is powered on and started.

According to a first aspect, an embodiment of the present invention provides a shutdown method, including:

receiving a shutdown instruction of a user, where the shutdown instruction of the user is used to instruct a terminal to perform a shutdown;

determining whether a first shutdown mode is enabled; and if the first shutdown mode is enabled, shutting down the terminal according to the first shutdown mode, where, in the first shutdown mode, a communication processor and a static random access memory storing a recovery program of the terminal are in a power-on state, where the recovery program includes current field information of the terminal, used for the communication processor to read and run the recovery program of the communication processor at a next startup of the terminal, so that the terminal is recovered to a state before a last shutdown.

With reference to the first aspect, in a first implementation manner, the step of determining whether a first shutdown mode is enabled includes:

determining, according to whether a current state of the terminal satisfies a preset enabling condition, whether the first shutdown mode is enabled; and if the current state of the terminal satisfies the preset enabling condition, determining that the first shutdown mode is enabled; or otherwise, determining that the first shutdown mode is disabled.

With reference to the first aspect, in the first implementation manner, the preset enabling condition includes the following:

no universal serial bus is currently inserted into the terminal; and a historical accumulative count of consecutive shutdowns performed by the terminal according to the first shutdown mode is less than a predetermined accumulative count upper limit; and an accumulative duration of shutdown processing of consecutive shutdowns performed by the terminal according to the first shutdown mode is less than a predetermined accumulative duration upper limit; and an available subscriber identity module is currently installed in the terminal.

With reference to the first aspect, in the first implementation manner, the shutting down the terminal according to the first shutdown mode, includes:

storing state information of the communication processor and components controlled by the communication processor into a second memory, and keeping the second memory in a power-on state, so that the terminal is started according to the stored state information when the terminal is powered on and started, where the state information includes system information and task information;

storing the recovery program of the communication processor into the static random access memory, and keeping the static random access memory in a power-on state;

re-mapping a storage address of the recovery program of the communication processor in the static random access memory, so that the storage address of the recovery program of the communication processor in the static random access memory is used as an initial read address of the processor when the terminal is powered on and started;

cutting off, according to shutdown voting confirmation messages of voting sources corresponding to the communication processor, power of the communication processor and the voting sources, where the voting sources are the components controlled by the communication processor; and keeping an interrupt input end of power management in an interrupt controller of the communication processor in an enabled state, keeping a pre-designated enabled interrupt input end in the interrupt controller of the communication processor in an enabled state, and controlling other interrupt input ends than the interrupt input end of the power management and the pre-designated enabled interrupt input end in the interrupt controller of the communication processor to be in a disabled state to enter a shutdown state.

With reference to the first aspect, in the first implementation manner, the components controlled by the communication processor further include at least one application processor, and after the step of controlling other interrupt input ends than the interrupt input end of the power management unit and the pre-designated enabled interrupt input end in the interrupt controller of the communication processor to be in a disabled state, the method further includes:

controlling each interrupt input end in an interrupt controller of the at least one application processor to be in a disabled state.

With reference to the first aspect, in the first implementation manner, when the voting sources corresponding to the communication processor are the at least one application processor, the cutting off, according to shutdown voting confirmation messages of voting sources corresponding to the communication processor, power of the communication processor and the voting sources, includes:

sending a shutdown voting notification to the at least one application processor;

sending, by the at least one application processor, a shutdown voting notification to shutdown voting sources corresponding to each application processor;

receiving, by the at least one application processor, shutdown voting confirmation messages of the shutdown voting sources corresponding to each application processor, where the shutdown voting confirmation messages include: shutdown-allowed confirmation information;

after the at least one application processor receives the shutdown voting confirmation messages of all shutdown voting sources corresponding to each application processor, sending the shutdown voting confirmation messages to the communication processor;

powering off each of the application processors; and after the communication processor receives the shutdown voting confirmation messages of all the application processors, cutting off power of the communication processor.

With reference to the first aspect, in the first implementation manner, when the pre-designated enabled interrupt input end is null, the controlling other interrupt input ends than the interrupt input end of the power management and the pre-designated enabled interrupt input end in the interrupt controller of the communication processor to be in a disabled state includes:

keeping the interrupt input end of the power management unit in an enabled state, controlling a first real-time clock in the power management unit to be enabled, where an output end of the first real-time clock is connected to the interrupt input end of the power management unit, and controlling other interrupt input ends than the interrupt input end of the power management unit in the interrupt controller of the communication processor to be in a disabled state, where the first real-time clock is used to calculate a duration of a current shutdown of the terminal after the terminal enters the shutdown state and output a real-time clock interrupt when the duration of the current shutdown reaches a predetermined shutdown duration upper limit, where the real-time clock interrupt is used to control other interrupt input ends than the interrupt input end of the power management unit in the first interrupt controller to be in a disabled state; or when the pre-designated enabled interrupt input end is an interrupt input end of a real-time clock in the interrupt controller of the communication processor, the controlling other interrupt input ends than the interrupt input end of the power management unit and the pre-designated enabled interrupt input end in the interrupt controller of the communication processor to be in a disabled state includes:

keeping the interrupt input end of the power management unit and the interrupt input end of the real-time clock in the interrupt controller of the communication processor in an enabled state, where the interrupt input end of the real-time clock in the interrupt controller of the communication processor is used to control a second real-time clock connected to the interrupt input end of the real-time clock in the interrupt controller of the communication processor to be in an enabled state, where the second real-time clock is used to calculate a duration of a current shutdown of the terminal after the terminal enters the shutdown state and output a real-time clock interrupt when the duration of the current shutdown reaches a predetermined shutdown duration upper limit, where the real-time clock interrupt is used to control other interrupt input ends than the interrupt input end of the power management unit in the first interrupt controller to be in a disabled state.

With reference to the first aspect, in the first implementation manner, the method further includes:

if the first shutdown mode is disabled, performing a shutdown according to a second shutdown mode, where, in the second shutdown mode, all components of the terminal are in a power-off state.

According to a second aspect, an embodiment of the present invention provides a startup method, including:

receiving a startup signal, where the startup signal is used to trigger a terminal to perform a startup; and supplying power to components of the terminal;

starting the terminal according to a first startup mode; and if the startup according to the first startup mode fails, performing a startup according to a second startup mode;

where, in the first startup mode, a communication processor of the terminal performs a startup according to a pre-stored recovery program of the communication processor, and reads and runs the recovery program of the communication processor to recover the communication processor to a state before a last shutdown of the terminal, and in the second startup mode, the terminal reads and runs a boot program to perform a startup.

With reference to the second aspect, in a first implementation manner, the performing a startup according to a first startup mode includes:

reading and running the recovery program to recover the communication processor to a state before a last shutdown of the terminal;

determining whether the first startup mode is enabled; and if the first startup mode is enabled, controlling each interrupt input end in an interrupt controller of the communication processor to be in an enabled state;

configuring system information of a subscriber identity module of the terminal as pre-stored system information of the subscriber identity module; and configuring communication parameters of the terminal according to current change information of the subscriber identity module of the terminal and the pre-stored system information of the subscriber identity module, so as to enter a startup state.

With reference to the second aspect, in the first implementation manner, after the step of supplying power to components of the terminal, and before the step of starting the terminal according to the first startup mode, the method further includes: if the startup signal is triggered by the terminal itself because the shutdown duration of the terminal reaches the predetermined shutdown upper limit, determining whether the first startup mode is enabled; and if the first startup mode is enabled, performing a startup according to the first startup mode; or if the first startup mode is disabled, controlling the shutdown duration to return to zero, cutting off power of the components of the terminal, and stopping the startup; or if the startup signal is triggered by the user, and the duration in which the power key is triggered is shorter than the predetermined duration, determining whether the first startup mode is enabled; and if the first startup mode is enabled, performing the step of starting the terminal according to the first startup mode; or if the first startup mode is disabled, cutting off power of the components of the terminal, and stopping the startup; or if the startup signal is triggered because the user triggers the predetermined system update composite key of the terminal, determining whether the first startup mode is enabled; and if the first startup mode is enabled, performing the step of starting the terminal according to the first startup mode; or if the first startup mode is disabled, recovering a startup initial read address of the terminal to a default state, wherein the processor performs a system update process.

With reference to the second aspect, in the first implementation manner, the configuring communication parameters of the terminal according to current change information of the subscriber identity module of the terminal and the pre-stored system information of the subscriber identity module includes:

if no subscriber identity module is currently installed in the terminal, or an installed subscriber identity module is unavailable, deleting, by the communication processor, the pre-stored system information of the subscriber identity module, and notifying, by the communication processor, a network access service component that no subscriber identity module exists currently, so as to enter a startup state in which communication is unavailable;

if an available subscriber identity module is currently installed in the terminal, and information of the subscriber identity module currently installed in the terminal is consistent with the pre-stored system information of the subscriber identity module, sending, by the processor, the pre-stored system information of the subscriber identity module to the network access service component of the terminal, and configuring, by the network access service component, the communication parameters of the terminal according to the pre-stored system information of the subscriber identity module, so as to enter a startup state in which communication is available; and if a subscriber identity module is currently installed in the terminal, and information of the subscriber identity module currently installed in the terminal is inconsistent with the pre-stored system information of the subscriber identity module, initializing, by the processor, the currently installed subscriber identity module, updating, by the processor, the system information of the subscriber identity module of the terminal from the pre-stored system information of the subscriber identity module to the information of the currently installed subscriber identity module, sending, by the processor, the information of the currently installed subscriber identity module to the network access service component, and configuring, by the network access service component, the communication parameters of the terminal according to the pre-stored system information of the subscriber identity module, so as to enter a startup state in which communication is available.

With reference to the second aspect, in the first implementation manner, the terminal further includes at least one application processor connected to the communication controller; and after the step of recovering the communication processor to the state before the shutdown of the terminal, the method further includes:

controlling, by the communication processor, each application processor to read and run a recovery program of the application processor, so as to recover the application processor to a state before the last shutdown of the terminal, and controlling, by the application processor, each interrupt input end in an interrupt controller of the application processor to be in an enabled state.

According to a third aspect, an embodiment of the present invention provides a communication terminal, including:

a static random access memory, adapted to store data under control of a communication processor, where the stored data includes at least a recovery program of the communication processor; and the communication processor, adapted to control components of the terminal, and perform a startup and shutdown of the terminal, where the startup includes:

after a startup signal is received, performing a startup according to a first startup mode, and if the startup according to the first startup mode fails, performing a startup according to a second startup mode, where, in the first startup mode, the terminal performs a startup according to the pre-stored recovery program of the communication processor, and in the second startup mode, the terminal reads and runs a boot program to perform a startup.

With reference to the third aspect, in a first implementation manner, the communication processor is further adapted to determine, after receiving a shutdown instruction of a user for instructing the terminal to perform a shutdown, whether a first shutdown mode is enabled; and if the first shutdown mode is enabled, shut down the terminal according to the first shutdown mode, where, in the first shutdown mode, the communication processor and the static random access memory of the terminal are in a power-on state.

With reference to the third aspect, in the first implementation manner, the communication processor being adapted to determine whether the first shutdown mode is enabled includes:

determining, according to whether a current state of the terminal satisfies a preset enabling condition, whether the first shutdown mode is enabled; and if the current state of the terminal satisfies the preset enabling condition, determining that the first shutdown mode is enabled; or otherwise, determining that the first shutdown mode is disabled.

With reference to the third aspect, in the first implementation manner, the preset enabling condition includes the following:

no universal serial bus is currently inserted into the terminal; and a historical accumulative count of consecutive shutdowns performed by the terminal according to the first shutdown mode is less than a predetermined accumulative count upper limit; and an accumulative duration of shutdown processing of consecutive shutdowns performed by the terminal according to the first shutdown mode is less than a predetermined accumulative duration upper limit; and an available subscriber identity module is currently installed in the terminal With reference to the third aspect, in the first implementation manner, the communication processor being adapted to perform a shutdown according to the first shutdown mode includes:

being adapted to store state information of the communication processor and components controlled by the communication processor into a second memory, and keep the second memory in a power-on state, so that the terminal is started according to the stored state information when the terminal is powered on and started, where the state information includes system information and task information;

being adapted to store the recovery program of the communication processor into the static random access memory, and keep the static random access memory in a power-on state;

being adapted to re-map a storage address of the recovery program of the communication processor in the static random access memory, so that the storage address of the recovery program of the communication processor in the static random access memory is used as an initial read address of the processor when the terminal is powered on and started;

being adapted to keep an interrupt input end of power management in an interrupt controller of the communication processor in an enabled state, keep a pre-designated enabled interrupt input end in the interrupt controller of the communication processor in an enabled state, and control other interrupt input ends than the interrupt input end of the power management unit and the pre-designated enabled interrupt input end in the interrupt controller of the communication processor to be in a disabled state to enter a shutdown state; and being adapted to cut off, according to shutdown voting confirmation messages of voting sources corresponding to the communication processor, power of the communication processor and the voting sources, where the voting sources are the components controlled by the communication processor.

With reference to the third aspect, in the first implementation manner, the components controlled by the communication processor include at least one application processor adapted to work under control of the communication processor; and the communication processor being adapted to perform a shutdown according to the first shutdown mode further includes:

after controlling other interrupt input ends than the interrupt input end of the power management unit and the pre-designated enabled interrupt input end in the interrupt controller of the communication processor to be in a disabled state, being further adapted to control each interrupt input end in an interrupt controller of the at least one application processor to be in a disabled state.

With reference to the third aspect, in the first implementation manner, the communication processor being adapted to perform a startup according to a first startup mode includes:

being adapted to read and run the recovery program to recover the communication processor to a state before a last shutdown of the terminal; and if the first startup mode is enabled, being further adapted to control each interrupt input end in an interrupt controller of the communication processor to be in an enabled state, configure system information of a subscriber identity module of the terminal as pre-stored system information of the subscriber identity module, and configure communication parameters of the terminal according to current change information of the subscriber identity module of the terminal and the pre-stored system information of the subscriber identity module, so as to enter a startup state.

With reference to the third aspect, in the first implementation manner, the communication processor being adapted to determine whether the first startup mode is enabled includes:

being adapted to instruct the at least one application processor to execute the shutdown instruction of the user, and determine, according to a determination result of the first startup mode fed back by the at least one application processor, whether the first startup mode is enabled; and after receiving the shutdown instruction of the user, the application processor being further adapted to determine whether a current state of the terminal satisfies a preset first startup enabling condition; and if so, determine that the first startup mode is enabled; or otherwise, determine that the first startup mode is disabled; where the first startup enabling condition includes the following: the startup signal is triggered not because a shutdown duration of a real-time clock interrupter reaches a predetermined shutdown upper limit; and the terminal is currently not connected to an external power supply; and the startup signal is triggered because the user triggers a power key and a duration in which the power key is triggered is longer than or equal to a predetermined duration; and the startup signal is triggered not because the user triggers a predetermined system update composite key.

With reference to the third aspect, in the first implementation manner, after supplying power to components of the terminal, and before performing a startup according to a first startup mode, the communication processor is further adapted to:

if the startup signal is triggered by the terminal itself because the shutdown duration of the terminal reaches the predetermined shutdown upper limit, determine whether the first startup mode of the communication processor is enabled; and if the first startup mode is disabled, control the shutdown duration to return to zero, cut off power of the components of the terminal, and stop the startup; or if the startup signal is triggered by the user, and the duration in which the power key is triggered is shorter than the predetermined duration, determine whether the first startup mode is enabled; and if the first startup mode is disabled, cut off power of the components of the terminal, and stop the startup; or if the startup signal is triggered because the user triggers the predetermined system update composite key, determine whether the first startup mode is enabled; and if the first startup mode is disabled, recover a startup initial read address of the terminal to a default state, wherein the processor performs a system update process.

As can be seen from the above, by applying the technical solutions of the embodiments, in the present invention, after a shutdown instruction of a user is received, if a terminal is in a first shutdown mode enabled state, the terminal is shut down according to the first shutdown mode, where, in the first shutdown mode, a communication processor and a static random access memory storing a recovery program of the terminal of the communication processor are kept in a power-on state. In this way, at a next startup of the terminal, the communication processor, as a master processor of the terminal, may read and run the recovery program of the communication processor immediately after power-on, so that the communication processor is recovered to a state before a last shutdown of the terminal and the terminal is started quickly.

In comparison, in the technical solution in the prior art, the terminal directly cuts off power of components of the terminal after receiving a shutdown instruction, and when the terminal is powered on and started again, it is necessary to load a boot program in a flash memory to a DDR, and then run the boot program in the DDR to perform a series of processes such as system parameter initialization and configuration processing. By applying the technical solutions of the embodiments, the startup processing of the user is quicker. Therefore, the technical solutions of the embodiments are applied to help to improve use experience of the user and improve use experience of a customer.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
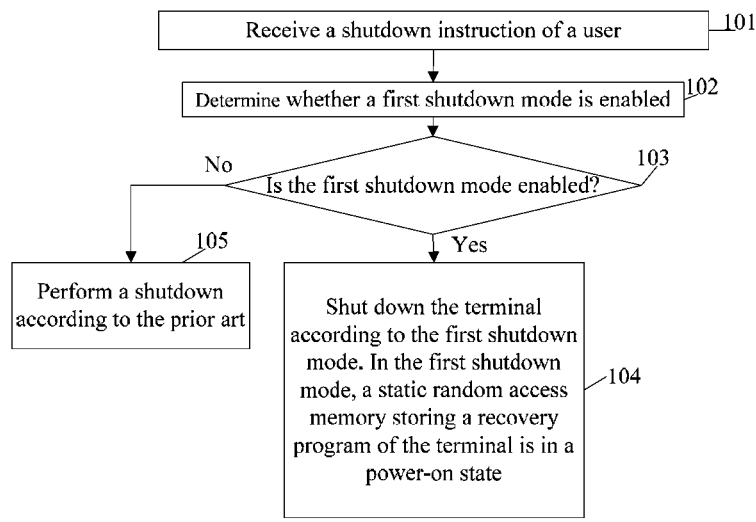
FIG. 1 is a schematic flowchart of a shutdown method according to Embodiment 1 of the present invention.

Referring to FIG. 1, this embodiment provides a shutdown method by using an example in which the technical solution of the present invention is applied to a communication terminal, where the shutdown method mainly includes the following procedure:

Step 101: Receive a shutdown instruction of a user.

The shutdown instruction of the user is used to instruct a terminal to perform a shutdown.

Step 102: Determine whether a first shutdown mode is enabled.

This step may include but is not limited to determining, by the terminal, whether a current state of the terminal satisfies a preset enabling condition; and if the current state of the terminal satisfies the preset enabling condition, determining that the first shutdown mode is enabled; or otherwise, determining that the first shutdown mode is disabled.

Step 103: If the first shutdown mode is enabled, perform step 104, or otherwise, perform step 105.

Step 104: Shut down the terminal according to the first shutdown mode.

In the first shutdown mode, a communication processor and a static random access memory storing a recovery program of the terminal of the communication processor are in a power-on state. In this way, at a next startup of the terminal, the communication processor, as a master processor of the terminal, may read and run the recovery program of the communication processor immediately after power-on, so that the communication processor is recovered to a state before a last shutdown of the terminal and the terminal is started quickly.

Step 105: Perform a shutdown according to the prior art.

If the first shutdown mode is disabled, a shutdown may be performed according to the prior art, which is not further described herein.

As can be seen from the above, by applying the technical solution of this embodiment, after a shutdown instruction of a user is received, if a terminal is in a first shutdown mode enabled state, the terminal is shut down according to the first shutdown mode, where, in the first shutdown mode, a communication processor and a static random access memory storing a recovery program of the terminal of the communication processor are kept in a power-on state. In this way, at a next startup of the terminal, the communication processor, as a master processor of the terminal, may read and run the recovery program of the communication processor immediately after power-on, so that the communication processor is recovered to a state before a last shutdown of the terminal and the terminal is started quickly.

In comparison, in the technical solution in the prior art, the terminal directly cuts off power of components of the terminal after receiving a shutdown instruction, and when the terminal is powered on and started again, it is necessary to load a boot program in a flash memory to a DDR, and then run the boot program in the DDR to perform a series of processes such as system parameter initialization and configuration processing. By applying the technical solution of this embodiment, the startup processing of the user is quicker. Therefore, the technical solution of this embodiment is applied to help to improve user experience.

Embodiment 2

Figure 2:
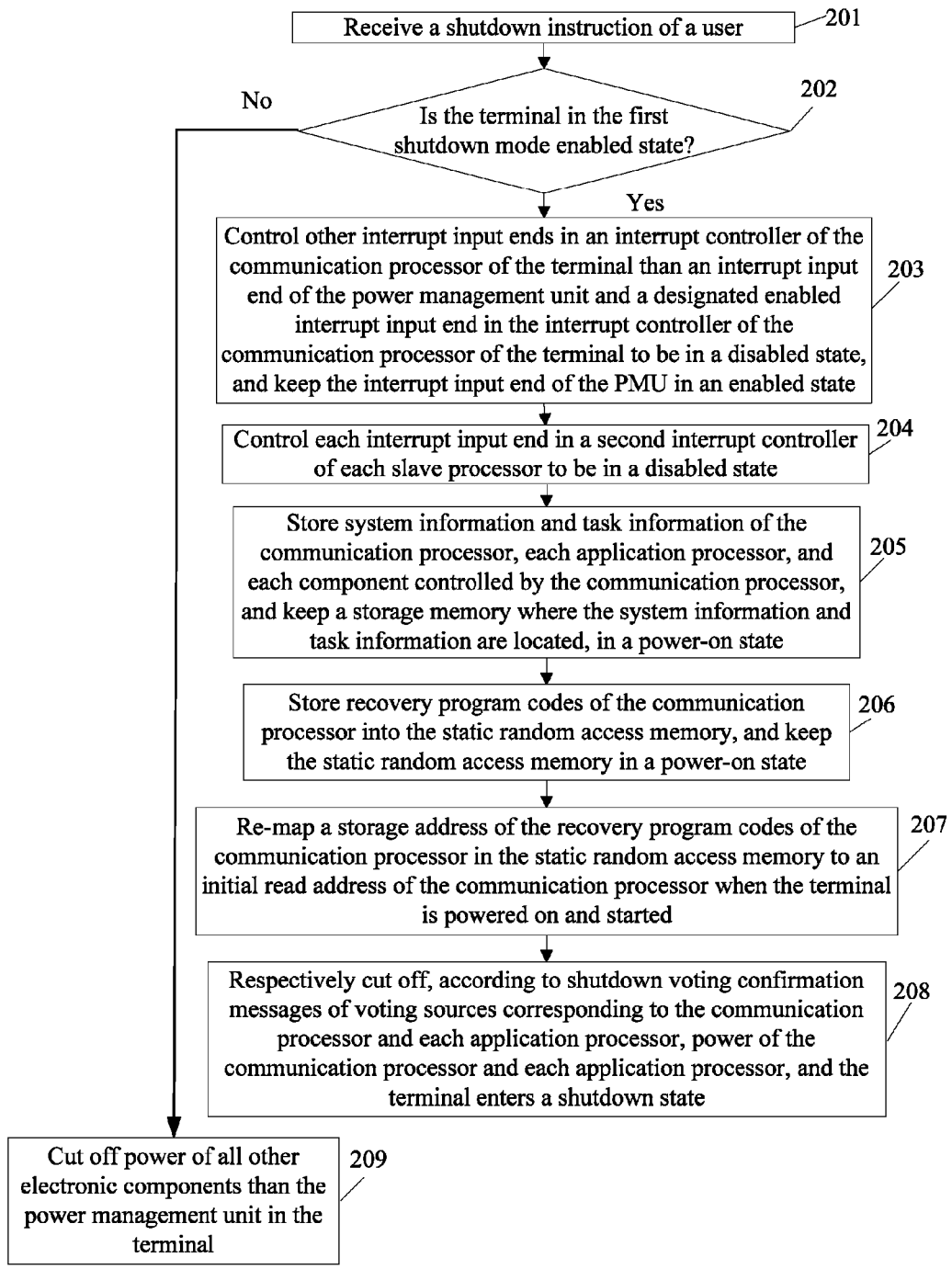
FIG. 2 is a schematic flowchart of a shutdown method according to Embodiment 2 of the present invention.

Referring to FIG. 2, this embodiment provides a shutdown method by using an example in which the technical solution of the present invention is applied to a communication terminal having multiple processors. The communication terminal mainly includes a communication processor (where the communication processor is used as a master processor in the present invention) and multiple application processors (where the application processors are controlled by the communication processor functioning as the master processor and are also called slave processors).

The shutdown method provided by this embodiment mainly includes the following procedure:

Step 201: Receive a shutdown instruction of a user.

When the user triggers a shutdown key of the communication terminal (where the key may be but is not limited to a hardware key set outside the terminal, and may also be a software button set in a user window), a shutdown instruction is input to the terminal.

In this embodiment, when the user triggers the shutdown instruction by pressing and holding a power key, the communication processor in the communication terminal receives the shutdown instruction of the user according to the shutdown instruction triggered by the key.

In this embodiment, the terminal determines whether a shutdown is enabled only after receiving the shutdown instruction triggered by the user, and performs shutdown processing only when the terminal is currently in a first shutdown mode enabled state. A shutdown caused by a shutdown instruction not triggered by the user is processed according to the shutdown procedure of the prior art, where the whole terminal is powered off and completely stops working.

For example, in this embodiment, when the shutdown of the terminal is triggered because a protection circuit of the terminal sends a shutdown instruction due to a high temperature or low temperature of the terminal, and not because the shutdown instruction triggered by the shutdown of the user is received, the shutdown according to the first shutdown mode is prohibited and the shutdown is processed according to the shutdown procedure of the prior art.

When the terminal is in the shutdown state according to the prior art, the battery of the terminal supplies power to only a power management unit (PMU for short). A hardware power key of the terminal (generally described as a power key) is directly connected to the PMU, and all other components than the PMU are powered off. After the terminal is shut down according to the prior art, and the user triggers the Power key to trigger a startup instruction, the terminal performs a startup processing procedure according to the prior art: The PMU of the terminal supplies power to a baseband (BB for short) processor of the terminal; the communication processor (which may be but is not limited to an ARM chip) starts a boot procedure and jumps to an startup initial read address of the communication processor: address 0. In the prior art, the startup initial read address of the communication processor corresponds to address 0 of the flash memory (Nand Flash) by default, and the communication processor runs the boot loader process.

Step 202: If the terminal is in the first shutdown mode enabled state, perform step 203, or otherwise, perform step 209.

After the terminal receives the shutdown instruction of the user, the terminal determines whether the current first shutdown mode of the terminal is enabled, that is, whether the current state of the terminal is first shutdown mode enabled, and if so, performs processing of the shutdown procedure according to the first shutdown mode in steps 203-208; or otherwise, performs a shutdown according to the conventional shutdown mode in the prior art, namely, a second shutdown mode.

After the shutdown instruction that is triggered by the user is received, this embodiment may include but is not limited to controlling, by the communication processor, an application processor, so that the application processor determines whether the first shutdown mode of the terminal is currently enabled: querying current system state information of the terminal and peripheral information to obtain the current state of the terminal; if the current state of the terminal is consistent with a preset shutdown enabled state, determining that the terminal is currently in the first shutdown mode enabled state, or otherwise, determining that the terminal is currently in a shutdown disabled state.

In this embodiment, the technical solution in which the application processor determines whether the first shutdown mode of the terminal is enabled is only an example of this embodiment, and actually, the determining may be performed by the communication processor, which is not limited.

In this embodiment, the condition of the shutdown enabled state of the terminal may be added by the user by setting, and may also be pre-fixed by a terminal vendor. The present invention provides the following technical solution: After receiving the shutdown instruction triggered by the user, the terminal can determine, only after satisfying the following conditions, that the terminal is currently in the first shutdown mode enabled state:

Necessary condition 1: No universal serial bus (USB for short) is currently inserted into the terminal.

Necessary condition 2: A historical accumulative count of consecutive shutdown states currently entered by the terminal is less than a predetermined accumulative count upper limit. Assuming that the terminal is shut down and enters the shutdown state for 10 times consecutively according to shutdown instructions before the current time (where the historical accumulative count of consecutive shutdown states is cleared to zero every time when a shutdown according to the prior art occurs), but the accumulative count upper limit preset in the terminal is 8, it is regarded that the historical accumulative count 10 of consecutive shutdown states currently entered by the terminal is more than the predetermined accumulative count upper limit 8.

Necessary condition 3: An accumulative duration of shutdown processing of consecutive shutdown states currently entered by the terminal is less than a predetermined accumulative duration upper limit. Assuming that the terminal is shut down and enters the shutdown state for 10 times consecutively according to shutdown instructions before the current time (where the historical accumulative count of consecutive shutdown states is cleared to zero every time when a shutdown according to the prior art occurs), where assuming that the historical accumulative duration during the processing of the 10 shutdowns is 20 seconds, but the predetermined accumulative duration upper limit of the terminal is 25 seconds, the historical accumulative duration does not exceed the predetermined accumulative duration upper limit.

Necessary 4: An available subscriber identity module (SIM for short) is currently installed in the terminal.

If any one of the foregoing four necessary conditions is not satisfied, it is regarded that the terminal is currently in the shutdown disabled state, and therefore, the terminal performs processing according to the shutdown procedure of the prior art after receiving the shutdown instruction of the user.

The necessary conditions for first shutdown mode enabling may also be configured by the user.

Step 203: Control other interrupt input ends in an interrupt controller (i.e., a Generic Interrupt Controller, GIC for short) of the communication processor of the terminal than an interrupt input end of the power management unit and a pre-designated enabled interrupt input end in the interrupt controller of the communication processor of the terminal to be in a disabled state, and keep the interrupt input end of the PMU in an enabled state.

For ease of description in this embodiment, a GIC (GIC for short) in the communication processor is described as a first interrupt controller. All interrupt input ends in the first interrupt controller except the interrupt input end of the PMU connected to the PMU and the designated enabled interrupt input end in the first interrupt controller are disabled, and only the interrupt input end of the PMU and the designated interrupt input end in the first interrupt controller are reserved. In this case, the communication processor enters the transaction interrupt mask state and stops processing of a new task.

In steps of this embodiment, the designated enabled interrupt input end may be but is not limited to null. If the designated enabled interrupt input end is null, in this case, only the interrupt input end of the PMU in the first interrupt controller is enabled, while all other interrupt input ends are controlled to be in a disabled state, so that the terminal in the shutdown state can only receive an interrupt signal sent by the PMU connected to the power key. In this way, a system controller of the communication processor wakes up the communication processor according to the interrupt signal received by the interrupt input end of the PMU in the first interrupt controller, so that the terminal enters the first startup mode, namely, the subsequent quick startup process, which is not further described herein. For details, reference may be made to the description of the following embodiment.

In addition, as another exemplary technical solution of this embodiment, in this step, in addition to that the interrupt input end of the PMU in the first interrupt controller is kept enabled so that the terminal in the shutdown state may be waked up according to the startup instruction from the PMU, after the terminal enters the first shutdown mode and is shut down, the terminal may be further controlled correspondingly according to the current shutdown duration during the shutdown. The specific implementation technical solutions are shown as follows:

Implementation technical solution 1: The pre-designated enabled interrupt input end is null, that is, the enabled interrupt input end is not pre-designated currently.

The communication processor controls other interrupt input ends than the interrupt input end of the PMU in the first interrupt controller of the communication processor to be in a disabled state to mask the input of the interrupt input ends. The communication processor keeps only the interrupt input end of the PMU in the first interrupt controller in the enabled state, and enables a real-time clock (Real-Time Clock, RTC for short, described as a first RTC in this embodiment) in the PMU. In this way, the real-time clock is in a timing work state, so that after the terminal enters the shutdown state, the first RTC performs real-time timing for the current shutdown duration of the terminal. When the current shutdown duration of the terminal reaches the predetermined current shutdown duration upper limit, the first RTC of the PMU inputs an interrupt signal of the real-time clock through the interrupt input end of the PMU in the first interrupt controller of the communication processor of the terminal. The communication processor knows, according to the interrupt signal of the real-time clock, that the shutdown duration of the terminal reaches the current shutdown duration upper limit, and therefore the communication processor starts a normal shutdown program: All components except the PMU are powered off, and the battery of the terminal supplies power to only the PMU.

Implementation technical solution 2: The pre-designated enabled interrupt input end is an interrupt input end of the RTC in the first interrupt controller of the communication processor.

The communication processor controls other interrupt input ends than the interrupt input end of the PMU and the interrupt input end of the RTC in the first interrupt controller to be in a disabled state; the communication processor keeps the interrupt input end of the PMU and the interrupt input end of the RTC in the first interrupt controller in an enabled state, and enables an RTC (described as a second RTC, which may be but is not limited in the communication processor, or is disposed outside the communication processor and electrically connected to the communication processor) on the main controller so as to keep the second RTC in an enabled state, so that after the terminal enters the shutdown state, the second RTC performs real-time timing for the current shutdown duration of the terminal. When the current shutdown duration of the terminal reaches the predetermined current shutdown duration upper limit, the second RTC inputs an interrupt signal of the real-time clock to the interrupt input end of the RTC in the first interrupt controller of the communication processor. The communication processor knows, according to the interrupt signal of the real-time clock, that the shutdown duration of the terminal reaches the current shutdown duration upper limit, and therefore the communication processor starts a normal shutdown program: All components except the PMU are powered off, and the battery of the terminal supplies power to only the PMU.

In the foregoing implementation technical solution 1 and implementation technical solution 2, no matter whether the first RTC of the PMU is used to time the shutdown duration of the terminal, or the second RTC outside the PMU is used as an RTC for timing the current shutdown duration of the terminal, when the current shutdown duration of the terminal reaches the predetermined current shutdown duration upper limit, the timing value of the first RTC or second RTC returns to zero.

In this embodiment, in the foregoing implementation technical solution 1 and implementation technical solution 2, the second RTC on the main controller or the first RTC in the PMU may further be used to monitor the current shutdown duration of the terminal Therefore, when the current shutdown duration of the terminal reaches the predetermined current shutdown duration upper limit, an interrupt signal of the RTC is sent to the communication processor, so that the communication processor controls, according to the interrupt signal of the RTC, the terminal to enter the complete shutdown state, which helps to protect performance of the battery of the terminal and further reduce power consumption of the terminal.

In addition, in this embodiment, no matter whether the first RTC of the PMU is used to time the shutdown duration of the terminal, or the second RTC of the communication processor is used to time the shutdown duration of the terminal, different current shutdown duration upper limits may be set according to the level of current remaining power of the battery of the terminal. For example, if the remaining power of the battery of the terminal is greater than or equal to 80% of the total capacity (in this case, the output voltage of the battery is generally 4.0 V), the corresponding current shutdown duration upper limit of the terminal is preset to 96 hours; if the remaining power of the battery of the terminal is greater than or equal to 80% of the total capacity (in this case, the output voltage of the battery is generally 3.8 V), the corresponding current shutdown duration upper limit of the terminal is preset to 48 hours. Assuming that the output voltage of the battery of the terminal currently being in the shutdown state is 3.7 V, and the remaining power is less than 60% of the total capacity, the current shutdown duration upper limit of the terminal is preset to 48 hours. Therefore, after real-time timing of the first RCT (or the second RTC) reaches 48 hours, an interrupt signal of the RTC is sent to the communication processor, so that the main controller starts the shutdown procedure of the prior art according to the interrupt signal of the RTC, and all components except the PMU are powered off. The foregoing technical solution is further used to avoid energy consumption of the terminal caused by a long-time shutdown of the terminal, on the basis of facilitating applications for the user and increasing the quick startup speed of the user.

Step 204: Control each interrupt input end in an application interrupt controller of each application processor to be in a disabled state.

The application processor is a processor which performs corresponding application control with the communication processor under scheduling and control of the communication processor, in the terminal.

All interrupt input ends in the interrupt controller (all described as application interrupt controllers) of each application processor are controlled to be in a disabled state, so that each application processor stops processing and responding to external events (or tasks).

Step 205: Store system information and task information of the communication processor, each application processor, and each component controlled by the communication processor, and keep a storage memory where the system information and task information are located, in a power-on state.

In this embodiment, the memory storing the system information and task information of the communication processor, each application processor, and each component controlled by the communication processor is described as a second memory. The second memory may be but is not limited to a static random access memory, and may be designed to be integrated into or separated from a static random access memory storing a recovery program, which is not limited.

The system information and task information are described as state information.

The state information of the communication processor, each application processor, and each component controlled by the communication processor is stored, so that the terminal recovers the system according to the stored system information and task information, that is, recovers system configurations and task configurations of the communication processor, each application processor, and each component controlled by the communication processor to their respective states before the shutdown.

Components connected to the communication processor further include a SIM card. The stored system information of the components connected to the communication processor includes: information of the SIM card currently installed in the terminal, where information of the SIM card includes: an international mobile subscriber identification number (IMSI for short) and other necessary information for communication of the terminal In this embodiment, the system information and task information may be stored in a double data rate synchronous dynamic random access memory (DDR for short), or stored in a static random access memory (SRAM for short), which is not limited, or may be stored in a flash memory designated by the terminal. After the system information and task information are stored, the memory storing the system information and task information is in a power-on state and is kept in the power-on state after the terminal is shut down, to ensure robustness of the stored system information and task information. Assuming that the system information and task information are stored on the DDR, the DDR is kept in a power-on state. The DDR enters a self-refresh state to maintain robustness of data and avoid loss of data.

Step 206: Store recovery program codes of the communication processor into the static random access memory, and keep the static random access memory in a power-on state.

The recovery program codes that are copied from the flash memory (flash) to the communication processor in the DDR during the startup are copied and stored to the SRAM.

Recovery program codes of each processor, which are originally stored in the DDR, are copied and stored to the SRAM.

This step is performed so that when the user performs a startup after a shutdown and after each component is powered on, each processor may directly read the recovery program stored in the SRAM to recover to a system state and task state before a last shutdown, thereby implementing a quick startup.

This embodiment may also include but is not limited to replicating the recovery program codes of each application processor to the SDRAM, so that when the terminal is powered on again after the shutdown, each application processor may further read and run, under control of the communication processor, the recovery program stored in the SRAM to quickly recover to the system state and task state before the last shutdown, thereby further increasing the startup speed.

In addition, the SDRAM storing the recovery program codes of the communication processor (which may further store the recovery program codes of each application processor) is kept in the power-on state and is kept in the power-on state after the shutdown, thereby ensuring robustness of the data stored in the SDRAM.

Step 207: Re-map a storage address of the recovery program codes of the communication processor in the static random access memory to an initial read address of the communication processor when the terminal is powered on and started.

As a startup processor of the communication terminal, in this step of this embodiment, the communication processor further re-maps the initial read address of the communication processor when the terminal is powered on and started, that is, re-maps the storage address of the recovery program codes of the communication processor in the SDRAM to default address 0 in the flash memory (generally Nand-Flash), so that after the terminal is powered on and started by the user after the shutdown, the communication processor directly reads, during the power-on and startup, the recovery program codes in the SDRAM to perform recovery program processing, and recovers the main controller to a state before the shutdown.

Step 208: Respectively cut off, according to shutdown voting confirmation messages of voting sources corresponding to the communication processor and each application processor, power of the communication processor and each application processor, and the terminal enters a shutdown state.

In this step, according to the predetermined shutdown control program, the application processor and master processor respectively perform signaling communication with each shutdown voting source (each component in the terminal) corresponding to the processors, and respectively enter a shutdown state according to the shutdown voting confirmation messages of voting sources corresponding to the processors after receiving all shutdown voting confirmation messages corresponding to the processors.

In this embodiment, the invention puts forward a technical solution for shutdown voting processing, as shown in the following:

S1. The communication processor sends a shutdown instruction to each shutdown voting source corresponding to the communication processor.

Each application processor is controlled by the communication processor, and is a voting source of the communication processor. The communication processor sends a shutdown instruction to each shutdown voting source including each application processor, instructing each voting source to terminate current processing. After termination, each voting source sends a shutdown voting confirmation message to the communication processor, notifying the communication processor that the current voting source has completed processing and the communication processor is allowed to enter the shutdown state.

S2. Each application processor sends a shutdown instruction to each shutdown voting source corresponding to the application processor.

Each application processor sends a shutdown instruction to each shutdown voting source including the application processor, instructing each voting source to terminate current processing. After termination, each voting source sends a shutdown voting confirmation message to the corresponding application processor, notifying the corresponding application processor that the current voting source has completed processing and the corresponding application processor is allowed to enter the shutdown state.

S3. After each application processor completely collects the shutdown voting confirmation message of each voting source corresponding to the application processor, each application processor is used as a shutdown voting source corresponding to the communication processor to send a shutdown voting confirmation message to the communication processor.

S4. Each application processor cuts off power of the application processor, and each application processor is powered off.

S5. After the communication processor completely collects the shutdown voting confirmation message of each voting source corresponding to each application processor, the communication processor cuts off power of the communication processor, and the communication processor is powered off.

S6. The terminal enters the shutdown state. In this case, all other components of the terminal than the first interrupt controller, the system controller connected to the first interrupt controller, the PMU, the memory storing the recovery program codes, and the memory storing the system information and task information, are all powered off, and the terminal enters the shutdown state.

Step 209: Cut off power of all other electronic components than the power management unit in the terminal After the shutdown instruction of the user is received, if the communication processor determines that the terminal is in a shutdown disabled state, the communication processor starts the shutdown program according to the shutdown procedure of the prior art, so that all other electronic components than the PMU are powered off.

As can be seen from the above, by applying the technical solution of this embodiment, after a shutdown instruction of a user is received, if a terminal is in a first shutdown mode enabled state, the terminal keeps an interrupt input end of a power management unit in an interrupt controller of a communication processor that is used as a startup processor, and a pre-designated enabled interrupt input end (which may be but is not limited to null), in an enabled state, but controls all other interrupt input ends in each interrupt controller to be in a disabled state; in addition, recovery program codes of the communication processor are stored in an SDRAM (where the recovery program codes of each application processor may also be copied to the SDRAM, which is not limited). Furthermore, after the recovery program codes are stored, a storage address of the recovery program of the startup processor in the SDRAM is re-mapped to an initial read address of the startup processor when the terminal is powered on and started. Therefore, it is ensured that the communication processor directly reads and runs the recovery program in the SDRAM after the system is powered on and started again, and directly enters a recovery process.

In comparison, in the technical solution in the prior art, the terminal directly cuts off power of components of the terminal after receiving a shutdown instruction, and when the terminal is powered on and started again, it is necessary to load a boot program in a flash memory to a DDR, and then run the boot program in the DDR to perform a series of processes such as system parameter initialization and configuration processing. By applying the technical solution of this embodiment, the startup processing of the user is quicker. Therefore, the technical solution of this embodiment is applied to help to improve user experience.

It should be noted that the number of the foregoing application processors may be one or two or more, which is not limited.

Embodiment 3

This embodiment provides a shutdown method by using an example in which the technical solution of the present invention is applied to a communication terminal having only one processor. The processor in this embodiment implements functions of the communication processor and all application processors in Embodiment 2 in a centralized manner, and is a startup processor in the terminal of this embodiment.

Figure 3:
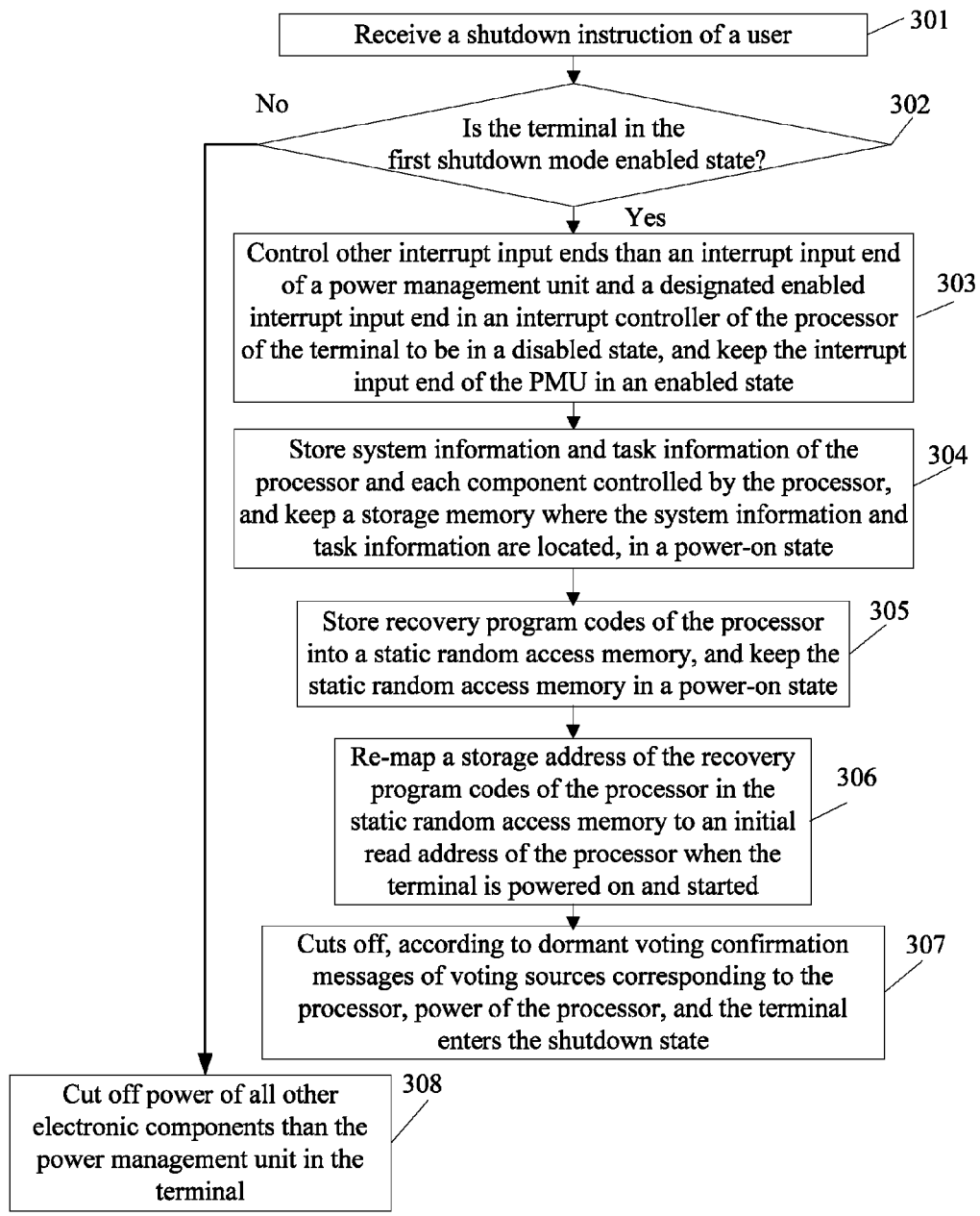
FIG. 3 is a schematic flowchart of a shutdown method according to Embodiment 3 of the present invention.

Referring to FIG. 3, this embodiment provides a shutdown method, where the method mainly includes the following procedure:

Step 301: Receive a shutdown instruction of a user.

Reference may be made to step 201 in Embodiment 2, where the communication processor in Embodiment 2 is the processor in this embodiment.

Step 302: If the terminal is in the first shutdown mode enabled state, perform steps 303-307 of performing a shutdown according to a first shutdown mode; or otherwise, perform step 308 of performing a shutdown according to a second shutdown mode according to the prior art. For details, reference may be made to step 202 in Embodiment 2. The communication processor and all the application processors in Embodiment 2 are implemented by one processor in this embodiment.

Step 303: Control other interrupt input ends than an interrupt input end of a power management unit and a designated enabled interrupt input end in an interrupt controller of the processor of the terminal to be in a disabled state, and keep the interrupt input end of the PMU in an enabled state.

For details, reference may be made to step 203 in Embodiment 2. The communication processor and all the application processors in Embodiment 2 are implemented by one processor in this embodiment.

Step 304: Store system information and task information of the processor and each component controlled by the processor, and keep a storage memory where the system information and task information are located, in a power-on state.

For details, reference may be made to step 205 in Embodiment 2. The communication processor and all the application processors in Embodiment 2 are implemented by one processor in this embodiment.

Step 305: Store recovery program codes of the processor into a static random access memory, and keep the static random access memory in a power-on state.

For details, reference may be made to step 206 in Embodiment 2. The communication processor and all the application processors in Embodiment 2 are implemented by one processor in this embodiment.

Step 306: Re-map a storage address of the recovery program codes of the processor in the static random access memory to an initial read address of the processor when the terminal is powered on and started.

For details, reference may be made to step 207 in Embodiment 2. The communication processor and all the application processors in Embodiment 2 are implemented by one processor in this embodiment.

Step 307: Cuts off, according to shutdown voting confirmation messages of voting sources corresponding to the processor, power of the processor, and the terminal enters the shutdown state.

For details, reference may be made to step 208 in Embodiment 2. The communication processor and all the application processors in Embodiment 2 are implemented by one processor in this embodiment.

Step 308: Cut off power of all other electronic components than the power management unit in the terminal For details, reference may be made to step 209 in Embodiment 2. The communication processor and all the application processors in Embodiment 2 are implemented by one processor in this embodiment.

Similar to Embodiment 2, as can be seen from the above, by applying the technical solution of this embodiment, after a shutdown instruction of a user is received, if a terminal is in a first shutdown mode enabled state, the terminal keeps an interrupt input end of a power management unit in an interrupt controller of a processor in the terminal, and a pre-designated enabled interrupt input end (which may be but is not limited to null), in an enabled state, but controls all other interrupt input ends in the interrupt controller to be in a disabled state; in addition, recovery program codes of the processor are stored in an SDRAM, and after the recovery program codes of the processor are stored, a storage address of the recovery program of the processor in the SDRAM is re-mapped to an initial read address of the processor when the terminal is powered on and started. Therefore, it is ensured that the processor directly reads and runs the recovery program in the SDRAM after the system is powered on and started again, and directly enters a recovery program.

In comparison, in the technical solution in the prior art, the terminal directly cuts off power of components of the terminal after receiving a shutdown instruction, and when the terminal is powered on and started again, it is necessary to load a boot program in a flash memory to a DDR, and then run the boot program in the DDR to perform a series of processes such as system parameter initialization and configuration processing. By applying the technical solution of this embodiment, the startup processing of the user is quicker. Therefore, the technical solution of this embodiment is applied to help to improve use experience of the user and improve use experience of a customer.

Embodiment 4

Figure 4:
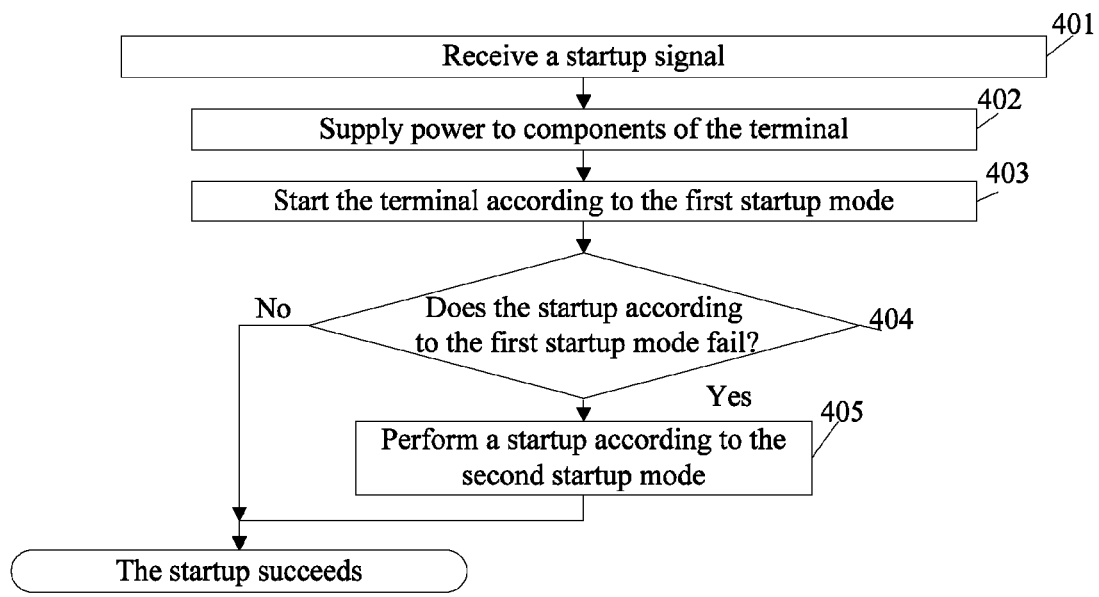
FIG. 4 is a schematic flowchart of a startup method for a communication terminal according to Embodiment 4 of the present invention.

Referring to FIG. 4, this embodiment provides a startup method by using an example in which the technical solution of the present invention is applied to a communication terminal, where the startup method mainly includes the following procedure:

Step 401: Receive a startup signal.

The startup signal is used to trigger a terminal to perform a startup, which may be triggered by a user or the terminal itself, which is not limited.

Step 402: Supply power to components of the terminal.

Components of the terminal are kept in a power-on state.

If the terminal specifically performs the last shutdown according to the first shutdown mode in any one of Embodiments 1-3, a communication processor and a static random access memory storing a recovery program are kept in a power-on state before the startup signal is received, and are supplied with power continuously after the startup signal is received, and power is supplied to other components.

If the terminal specifically performs the last shutdown according to the second shutdown mode in any one of Embodiments 1-3 or according to the prior art, the terminal supplies power to all components after receiving the startup signal.

Step 403: Start the terminal according to a first startup mode.

In this embodiment, the terminal is first started according to the predetermined first startup mode; if the startup fails, the terminal is started according to the startup mode in the prior art (described as the second startup mode), namely, the conventional startup mode, and the terminal reads and runs a boot program to perform a startup.

In the first startup mode of this embodiment, the communication processor of the terminal performs a startup according to the pre-stored recovery program of the communication processor, and reads and runs the recovery program of the communication processor, so as to recover the communication processor to a state before the last shutdown of the terminal Step 403: If the startup according to the first startup mode fails, perform step 405, or otherwise, perform step 404.

Step 404: Perform a startup according to the second startup mode.

As can be seen from the above, by applying the technical solution of this embodiment, in the present invention, after receiving a startup instruction, a terminal first performs a startup according to a first startup mode, that is, a communication processor used as a master processor of the terminal performs a startup according to a pre-stored recovery program of the communication processor, and reads and runs the recovery program of the communication processor, so as to recover the communication processor to a state before a last shutdown of the terminal, thereby implementing a quick startup of the communication terminal.

In comparison, in the technical solution in the prior art, the terminal directly cuts off power of components of the terminal after receiving a shutdown instruction, and when the terminal is powered on and started again, it is necessary to load a boot program in a flash memory to a DDR, and then run the boot program in the DDR to perform a series of processes such as system parameter initialization and configuration processing. By applying the technical solution of this embodiment, the startup processing of the user is quicker. Therefore, the technical solution of this embodiment is applied to help to improve user experience.

Embodiment 5

Figure 5:
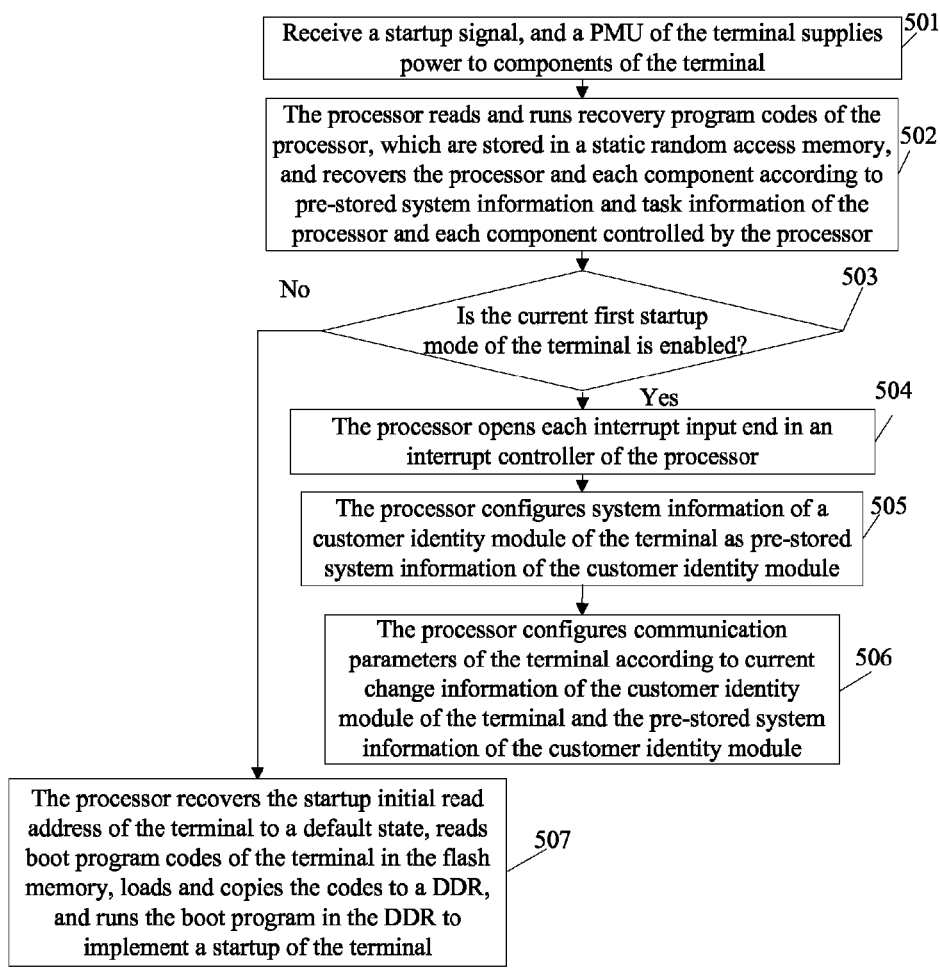
FIG. 5 is a schematic flowchart of a shutdown method according to Embodiment 5 of the present invention.

This embodiment provides a quick startup method for a communication terminal by using an example in which the technical solution of the present invention is applied to a communication terminal having one processor, where the processor integrates functions of a communication processor and an application processor in a communication terminal having multiple processors. Referring to FIG. 5, the quick startup method mainly includes the following procedure:

Step 501: Terminal receive a startup signal, and a PMU of the terminal supplies power to components of the terminal.

Under control of the PMU, power is supplied to components of the terminal, where the components include the following processor and other components.

After step 501, the terminal is started according to a first startup mode in steps 502-506; if the startup according to the first startup mode fails, the terminal is started in step 507 according to the prior art, namely, a second startup mode.

Step 502: The processor reads and runs recovery program codes of the processor, which are stored in a static random access memory, and recovers the processor and each component according to pre-stored system information and task information of the processor and each component controlled by the processor.

Because the terminal in this embodiment includes only one processor, the processor is naturally a startup processor of the terminal in this embodiment.

In this embodiment, recovery program codes of the processor are stored in an SDRAM, and after the recovery program codes are stored, a storage address of the recovery program codes of the processor in the SDRAM is re-mapped to an initial read address of the processor when the terminal is powered on and started. In this way, in this embodiment, after the system is powered on, the processor of the terminal can directly read, during the power-on and startup after a shutdown, the recovery program codes in the SDRAM, run the recovery program, and recover, according to the pre-stored system information and task information of the processor and each component controlled by the processor, the processor and each component to a work state and task state before the terminal is shut down.

Step 503: If the current first startup mode of the terminal is enabled, perform step 504, or otherwise, perform step 507.

If the first startup mode is disabled, a startup is performed in step 507 according to the prior art, namely, the second startup mode.

In this embodiment, the processor may specifically determine, according to the following technical solution, which is not limited, whether the current first startup mode of the terminal is enabled:

After the processor is started, the processor obtains current state information of the terminal, determines whether the current state information of the terminal satisfies a predetermined condition of a quick startup enabled state, and if so, determines that the first startup mode of the terminal is enabled, and performs quick startup processing according to the procedure of this embodiment, or otherwise, performs step 507.

In this embodiment, the predetermined condition of the quick startup enabled state may be set by a user or a terminal vendor.

In this embodiment, a technical solution for determining whether the first startup mode of the terminal is enabled is provided as follows:

If all of the following necessary conditions are satisfied, the processor determines that the first startup mode of the terminal is enabled:

Necessary condition 1: The startup signal is triggered not because a shutdown duration of a real-time clock interrupter reaches a predetermined shutdown upper limit.

If the startup signal is triggered because a shutdown duration of a RTC (which may be but is not limited to the first RTC and second RTC in Embodiments 2 and 3) reaches a predetermined shutdown upper limit, an operation may be further performed according to the following technical solution: The processor determines that the current first startup mode of the terminal is disabled, and further controls the shutdown duration of the RTC to return to zero, and cuts off power of components of the terminal; all components except the PMU in the terminal are powered off; the procedure is ended; and the startup is stopped. The technical solution is applied to help to avoid a wrong startup, help to avoid the problem of too large power consumption of the terminal caused by a long-time shutdown (where in the shutdown state, some components are in the power-on state), and help to reduce power consumption of the terminal on the basis of improving application experience of the user.

Necessary condition 2: The terminal is currently not connected to an external power supply.

If the terminal is externally connected to a charge power supply, an operation may be performed in the following manner, which is not limited: The processor determines that the current first startup mode of the terminal is disabled, and the processor is further controlled to reload and start according to the prior art, and the terminal is started according to the startup procedure of the prior art. The technical solution helps to improve compatibility between the technical solution of this embodiment and the terminal in the prior art.

Necessary condition 3: The startup signal is triggered because the user triggers a power key and a duration in which the power key is triggered is longer than or equal to a predetermined duration. Setting this necessary condition can avoid a startup caused by pressing a key wrongly by the user, and further improve robustness of applications and system stability of the terminal.

In this embodiment, if the startup signal is triggered because the user triggers a predetermined system update composite key of the terminal, an operation may be performed in the following manner, which is not limited: The processor recovers a startup initial read address of the terminal to a default state, that is, address 0 in the flash memory storing the boot program of the processor, and the processor performs a system update process. The technical solution is applied to help to improve compatibility between the technical solution of this embodiment and the terminal in the prior art, without changing the existing application habit of the user.

Step 504: The processor turns on each interrupt input end in an interrupt controller of the processor.

The processor turns on each interrupt input end in the interrupt controller of the processor, so that all interrupt input ends are in an enabled state. In this way, each interrupt input end may receive an external interrupt signal so that the processor can execute a corresponding event according to each interrupt signal.

Step 505: The processor configures system information of a subscriber identity module of the terminal as pre-stored system information of the subscriber identity module.

The processor configures information of the SIM card of the terminal according to the pre-stored system information and task information of each component controlled by the processor, and configures the information of the SIM card into the terminal system.

Step 506: The processor configures communication parameters of the terminal according to current change information of the subscriber identity module of the terminal and the pre-stored system information of the subscriber identity module.

After configuring the pre-stored system information of the SIM card as current information of the terminal, the processor further configures communication parameters of the terminal according to whether the current SIM card is in position and whether information of the SIM card in position is consistent with the pre-stored system information of the SIM card.

This embodiment may be performed according to the following technical solution, but is not limited thereto:

If no SIM card is currently inserted in the terminal or an installed SIM card is not available, that is, the SIM card is removed or damaged after the terminal is shut down, the processor deletes the pre-stored system information of the subscriber identity module; the processor notifies a network access service component, such as baseband (BB for short) processor, that: no SIM card is available currently and the terminal enters a startup state in which communication is unavailable. In this case, the terminal cannot be used for communication but a user may use applications unrelated to communication in the terminal. The technical solution is implemented to help to further optimize the startup procedure of the terminal.

If an available SIM card is currently inserted in the terminal, and information of the SIM card currently installed in the terminal is consistent with the pre-stored system information of the SIM card, that is, the SIM card of the terminal is not changed after the terminal is shut down, the processor sends the pre-stored system information of the SIM card to the BB of the terminal; the BB directly configures communication parameters of the terminal according to the pre-stored system information of the SIM card, where the communication parameters are specifically configured in the BB; the terminal enters a startup state in which communication is available. In this case, the user can not only use the terminal for communication but also use applications on the terminal.

If a SIM card is currently inserted in the terminal, and information of the SIM card currently installed in the terminal is inconsistent with the pre-stored system information of the SIM card, that is, the SIM card of the terminal is changed to another SIM card after the terminal is shut down, the processor initializes the currently installed SIM card, and updates the configuration information of the SIM card of the terminal from the pre-stored system information of the SIM card to information of the currently installed SIM card; the processor sends the information of the currently installed SIM card to the BB of the terminal; the BB configures communication parameters of the terminal according to the information of the currently installed SIM card, and the terminal enters a startup state in which communication is available. In this case, the user can not only use the terminal for communication but also use applications on the terminal.

Step 507: The processor recovers the startup initial read address of the terminal to a default state, reads boot program codes of the terminal in the flash memory, loads and copies the codes to a DDR, and runs the boot program in the DDR to implement a startup of the terminal. When the current first startup mode of the terminal is disabled, the startup processing of the terminal may be implemented according to the prior art in this step or other prior arts, which is not limited.

As can be seen from the above, by applying the technical solution of this embodiment, recovery program codes of a startup processor are pre-stored in a terminal before a startup; furthermore the startup processor may directly read recovery program codes during the power-on and startup, and is quickly recovered according to pre-stored system information and task information of the startup processor and each component controlled by the processor.

In comparison with the boot program in the prior art, after the terminal system is powered on, the startup processor reads a boot program in a flash memory storing a boot program of the startup processor, copies and loads the boot program to a DDR, then runs the boot program in the DDR, initializes components of the terminal, and completes the startup operation of the terminal.

As can be seen, compared with the prior art, the technical solution of this embodiment is applied to help to increase the startup speed greatly, improve terminal application experience of the user, and implement continuity of the application habit of the terminal.

Embodiment 6

This embodiment provides a quick startup method for a communication terminal by using an example in which the technical solution of the present invention is applied to a communication terminal having multiple processors. In the processors of the terminal, a communication processor is used as a master processor to perform a startup of the terminal, and other processors connected to the communication processor are described as application processors.

Figure 6:
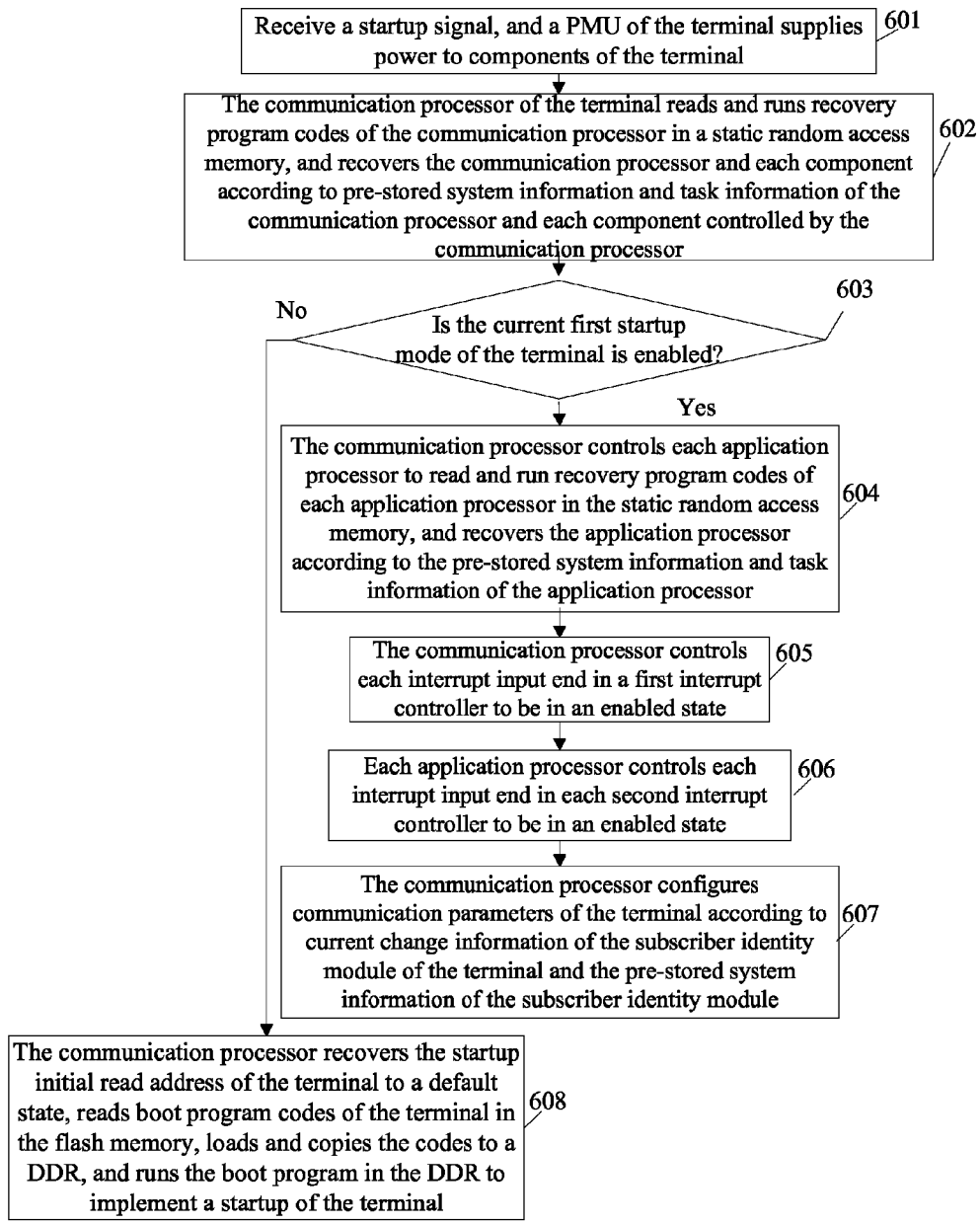
FIG. 6 is a schematic flowchart of a shutdown method according to Embodiment 6 of the present invention.

This embodiment provides a startup method for a communication terminal. Referring to FIG. 6, the startup method mainly includes the following procedure:

Step 601: Terminal receives a startup signal, and a PMU of the terminal supplies power to components of the terminal.

This step is basically similar to step 501 in Embodiment 5. In this embodiment, specifically a master processor in the terminal receives a startup signal triggered by a power key.

Step 602: The communication processor of the terminal reads and runs recovery program codes of the communication processor in a static random access memory, and recovers the communication processor and each component according to pre-stored system information and task information of the communication processor and each component controlled by the communication processor.

After power-on, a startup is performed according to a first startup mode in steps 602-607, and if the startup according to the first startup mode fails, a startup is performed in step 608 according to the prior art, namely, a second startup mode. The communication processor, as a startup processor of this embodiment, directly jumps to a current startup initial read address after power-on: a storage address of recovery program codes of the communication processor in an SDRAM, reads the recovery program codes, runs the recovery program, and in the process of running the recovery program, reads pre-stored system information and task information of the communication processor and the components controlled by the communication processor, and recovers the processor and each component to a work state and task state before the shutdown of the terminal.

In this step, when the system information and task information of each component of the communication processor are read, a SIM card is used as a component connected to the communication processor. In the terminal system, the pre-stored system information of the SIM card is configured as current information of the SIM card of the terminal For further details, reference may be made to step 502 in Embodiment 5.

Step 603: If the current first startup mode of the terminal is enabled, perform step 604, or otherwise, perform step 608.

If the first startup mode is disabled, a startup is performed in step 608 according to the prior art, namely, a second startup mode.

The communication processor determines whether the current first startup mode of the terminal is enabled. The communication processor may specifically determine, according to the technical solution provided by step 503 in Embodiment 5, whether the current first startup mode of the terminal is enabled, which is not limited.

For details, reference may be made to step 503 in Embodiment 5.

Step 604: The communication processor controls each application processor to read and run recovery program codes of each application processor in the static random access memory, and recovers the application processor according to the pre-stored system information and task information of the application processor.

This step is an exemplary step, and is performed when the SDRAM pre-stores system information and task information of each application processor.

When the communication processor is started and determines that the current first startup mode of the terminal is enabled, this step is performed.

The communication processor controls each application processor of the terminal to perform a startup. Each application processor reads recovery program codes of the application processor in the SDRAM according to a notification of the communication processor, runs the recovery program, and reads pre-stored system information and task information of the application processor in the process of running the recovery program. In this way, the application processor is recovered to the work state and task state before the shutdown of the terminal.

Step 605: The communication processor controls each interrupt input end in a first interrupt controller to be in an enabled state.

The communication processor turns on each interrupt input end in an interrupt controller (described as a first interrupt controller) of the communication processor, so that all interrupt input ends are in an enabled state. Therefore, each interrupt input end may receive an external interrupt signal so that the communication processor can execute a corresponding event according to each interrupt signal.

This step may be performed after step 603 and before step 604, which is not limited.

Step 606: Each application processor controls each interrupt input end in each second interrupt controller to be in an enabled state.

Each application processor turns on each interrupt input end in a interrupt controller (described as a second interrupt controller) of the application processor, so that all interrupt input ends are in an enabled state. In this way, each interrupt input end may receive an external interrupt signal so that each application processor can execute a corresponding event according to each interrupt signal.

Step 607: The communication processor configures communication parameters of the terminal according to current change information of the subscriber identity module of the terminal and the pre-stored system information of the subscriber identity module.

For more details, reference may be made to step 506 in Embodiment 5, which is not limited. The communication processor is used as an execution entity of this step.

Step 608: The communication processor recovers the startup initial read address of the terminal to a default state, reads boot program codes of the terminal in the flash memory, loads and copies the codes to a DDR, and runs the boot program in the DDR to implement a startup of the terminal.

When the current first startup mode of the terminal is disabled or the startup according to the first startup mode fails, the communication processor may implement startup processing of the terminal according to the prior art in this step or other prior arts, which is not limited. The specific startup procedure is not further described herein.

Similar to Embodiment 5, by applying the technical solution of this embodiment, recovery program codes of a communication processor used as a startup processor are pre-stored in a terminal before a startup; furthermore the startup processor may directly read the recovery program codes during the power-on and startup, and is quickly recovered according to pre-stored system information and task information of the startup processor and each component connected to the processor.

In comparison with the boot program in the prior art, after the terminal system is powered on, the communication processor reads a boot program in a flash memory storing a boot program, copies and loads the boot program to a DDR, then runs the boot program in the DDR, initializes components of the terminal, and completes the startup operation of the terminal.

As can be seen, compared with the prior art, the technical solution of this embodiment is applied to help to increase the startup speed greatly, improve terminal application experience of the user, and implement continuity of the application habit of the terminal.

Further, in this embodiment, an SDRAM further stores recovery program codes of each application processor, and pre-stores system information and task information of each application processor. In this way, after the communication processor is started and recovered, each application processor may also directly read the pre-stored recovery program codes and may be recovered to a system state and task state before the last shutdown according to the pre-stored system information and task information, thereby further increasing the startup speed of the terminal and improving application experience of the user.

Embodiment 7

Figure 7:
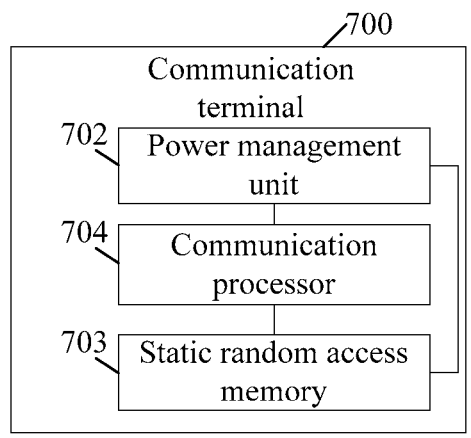
FIG. 7 is a schematic structural diagram of a communication terminal according to Embodiment 7 of the present invention.

Referring to FIG. 7, this embodiment provides a communication terminal 700, mainly including: a power management unit 702, a static random access memory 703, and a communication processor 704.

The power management unit 702 is adapted to control power supply to each component of the terminal according to a user trigger of a power key, so that each component is in a power-off state or a power-on state. For further details, reference may be made to Embodiments 1-6.

The static random access memory 703 is adapted to store data under control of the communication processor 704, where the stored data includes at least a recovery program of the communication processor, where the recovery program includes current field information of the terminal, used for the communication processor 704 to read and run the recovery program at a next startup of the terminal, so that the terminal is recovered to a state before a last shutdown.

The communication processor 704 is adapted to control components of the terminal, and perform a startup and shutdown of the terminal, where the startup includes: after a startup signal is received, performing, by the communication processor 704, a startup according to the pre-stored recovery program of the communication processor in the static random access memory 703, and if the startup according to the first startup mode fails, performing a startup according to a second startup mode, that is, reading and running a boot program to perform a startup according to the prior art.

In this embodiment, the startup signal may be triggered by a user trigger of a power key or triggered by the terminal itself, which is not limited.

As can be seen from the above, by applying the technical solution of this embodiment, in the present invention, after a startup instruction is received, a terminal first reads and runs a recovery program of a communication processor pre-stored in a static random access memory 703 to perform a startup, recovers the communication processor 704 to a state before a last shutdown, and implements a quick startup of the communication terminal. A startup is performed according to the prior art only when a quick startup cannot be performed.

In comparison, in the technical solution in the prior art, the terminal directly cuts off power of components of the terminal after receiving a shutdown instruction, and when the terminal is powered on and started again, it is necessary to load a boot program in a flash memory to a DDR, and then run the boot program in the DDR to perform a series of processes such as system parameter initialization and configuration processing. By applying the technical solution of this embodiment, the startup processing of the user is quicker. Therefore, the technical solution of this embodiment is applied to help to improve use experience of the user and improve use experience of a customer.

Embodiment 8

Figure 8:
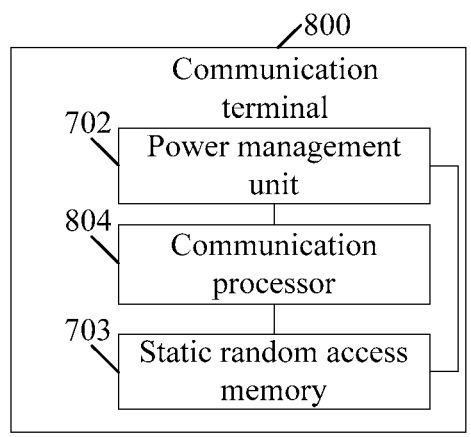
FIG. 8 is a schematic structural diagram of a communication terminal according to Embodiment 8 of the present invention.

Referring to FIG. 8, this embodiment provides a communication terminal 800, which is different from the communication terminal in Embodiment 7 in that:

in addition to performing the function of the communication processor 704, a communication processor 804 is further adapted to determine, after receiving a shutdown instruction of a user for instructing the terminal to perform a shutdown, whether a first shutdown mode is enabled; and if the first shutdown mode is enabled, the communication processor 804 performs a shutdown according to the first shutdown mode, where, in the first shutdown mode, the communication processor 804 and a static random access memory 703 storing a recovery program of the communication processor 804 are in a power-on state, thereby ensuring that the communication processor reads and runs the recovery program of the communication processor 804 at a next startup of the terminal, so that the terminal is recovered to a state before a last shutdown.

As can be seen from the above, the communication terminal 800 in this embodiment not only has the beneficial effect of Embodiment 7, but also can cause the communication terminal 800 to be started according to the field protection (keeping the communication terminal 800 and the static random access memory 703 storing the recovery program of the communication processor 804 powered on) of the first shutdown mode because the communication processor 804 implements the shutdown according to the first mode at the last shutdown, thereby implementing the quick startup of the first startup mode.

Embodiment 9

Figure 9:
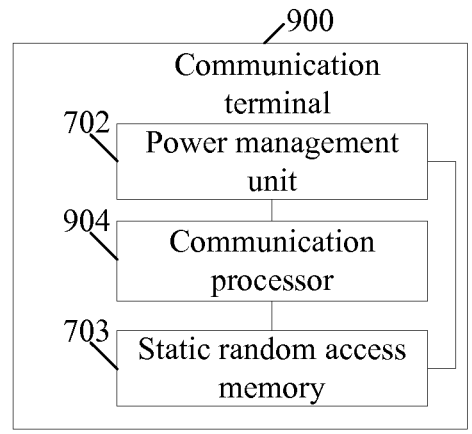
FIG. 9 is a schematic structural diagram of a communication terminal according to Embodiment 9 of the present invention.

Referring to FIG. 9, this embodiment provides a communication terminal 900, which is different from the communication terminal in Embodiment 8 in that:

a communication processor 904 is adapted to perform a shutdown according to a first shutdown mode as follows:

The communication processor 904 stores state information of the communication processor 904 and components controlled by the communication processor 904 into a second memory 905, and keeps the second memory 905 in a power-on state, so that the terminal is started according to the stored state information in the second memory 905 when the terminal is powered on and started, where the state information includes system information and task information.

The communication processor 904 stores a recovery program of the communication processor 904 into a static random access memory 703, and keeps the static random access memory 703 in a power-on state. In this embodiment, the second memory 905 may be but is not limited to a static random access memory.

The communication processor 904 re-maps a storage address of the recovery program of the communication processor 904 in the static random access memory 703, so that the storage address of the recovery program of the communication processor 904 in the static random access memory is used as an initial read address of the processor when the terminal is powered on and started, and the recovery program is directly read at a startup.

The communication processor 904 further cuts off, according to shutdown voting confirmation messages of voting sources corresponding to the communication processor, power of the communication processor 904 and the voting sources after receiving a shutdown signal, where the voting sources are the components controlled by the communication processor 904.

The communication processor 904 keeps an interrupt input end of power management in an interrupt controller of the communication processor in an enabled state, keeps a pre-designated enabled interrupt input end in the interrupt controller of the communication processor 904 in an enabled state, and controls other interrupt input ends than the interrupt input end of the power management unit and the pre-designated enabled interrupt input end in the interrupt controller of the communication processor 904 to be in a disabled state to enter a shutdown state.

This embodiment provides a communication processor 904 to implement the specific procedure of the shutdown of the first mode. For a further procedure, reference may be made to the description in Embodiments 1-8, which is not limited.

Embodiment 10

Figure 10:
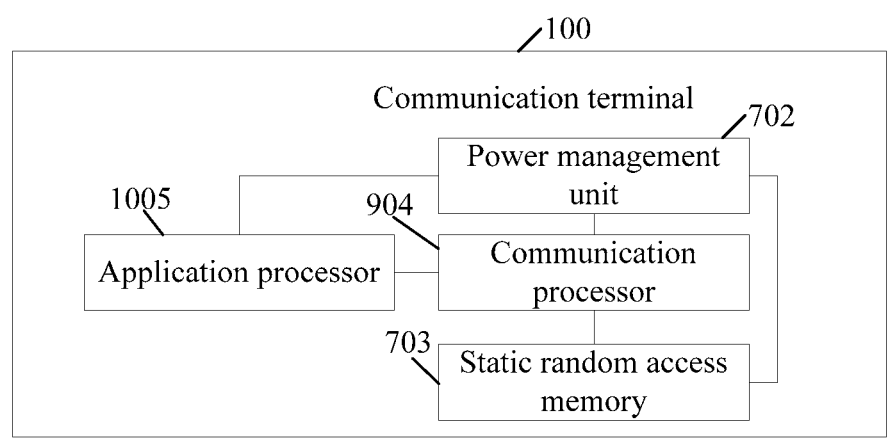
FIG. 10 is a schematic structural diagram of a communication terminal according to Embodiment 10 of the present invention.

Referring to FIG. 10, this embodiment provides a communication terminal 1000, which is different from the communication terminal in Embodiment 9 in that: components controlled by a communication processor 904 include at least one application processor 1005 adapted to work under control of the communication processor 904.

The communication processor 904 being adapted to perform a shutdown according to the first shutdown mode further includes:

after controlling other interrupt input ends than an interrupt input end of a power management unit and a pre-designated enabled interrupt input end in an interrupt controller of the communication processor to be in a disabled state, the communication processor 904 being further adapted to control each interrupt input end in an interrupt controller of each application processor 1005 to be in a disabled state. Each application processor 1005 is powered off under control of the communication processor 904.

Embodiment 11

Figure 11:
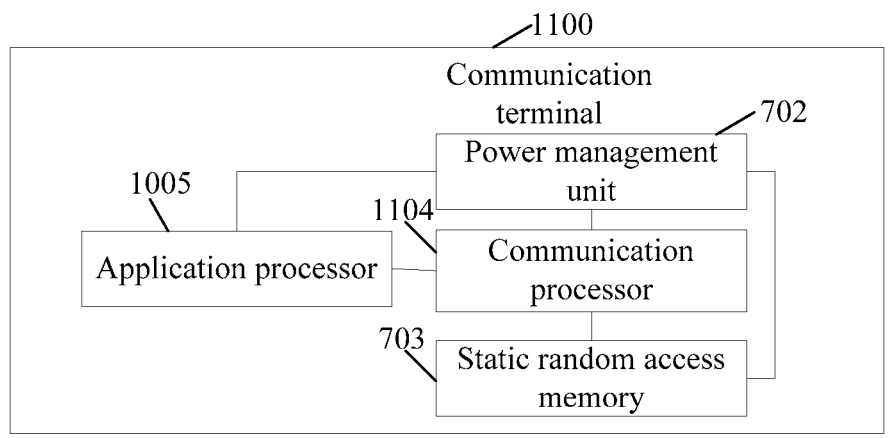
FIG. 11 is a schematic structural diagram of a communication terminal according to Embodiment 11 of the present invention.

Referring to FIG. 11, this embodiment provides a communication terminal 1100, which is different from those in Embodiments 7-10 in that:

a communication processor 1104 being adapted to perform a startup according to a first startup mode includes: the communication processor 1104 being adapted to read and run the recovery program to recover the communication processor 1104 to a state before a last shutdown of the terminal; and if the first startup mode is enabled, the communication processor 1104 being further adapted to control each interrupt input end in an interrupt controller of the communication processor 1104 to be in an enabled state;

in addition, the communication processor 1104 being further adapted to configure system information of a subscriber identity module of the terminal as pre-stored system information of the subscriber identity module; and configure communication parameters of the terminal according to current change information of the subscriber identity module of the terminal and the pre-stored system information of the subscriber identity module, so as to enter a startup state.

Specifically, for the specific procedure for configuring communication parameters of the terminal according to current change information of the subscriber identity module of the terminal and the pre-stored system information of the subscriber identity module, reference may be made to the description in Embodiment 5, which is not limited.

Embodiment 12

Figure 12:
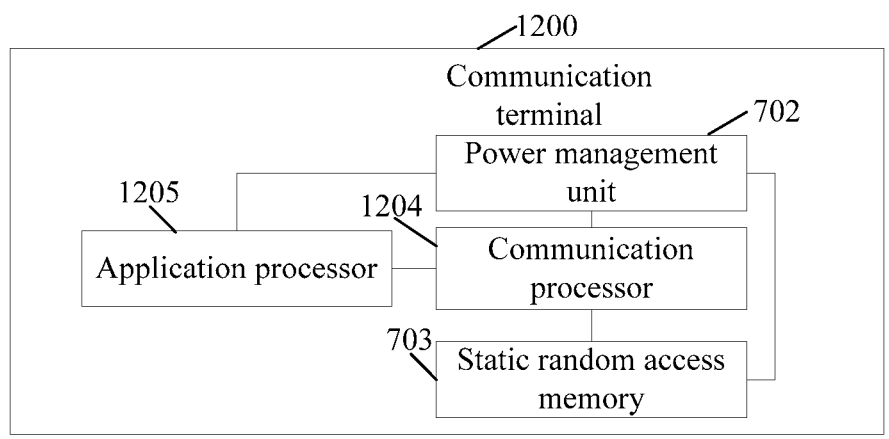
FIG. 12 is a schematic structural diagram of a communication terminal according to Embodiment 12 of the present invention.

Referring to FIG. 12, this embodiment provides a communication terminal 1200, which is different from the communication terminal in Embodiment 11 in that:

a communication processor 1204 being adapted to determine whether a first shutdown mode is enabled includes:

instructing, by the communication processor 1204, any application processor 1205 to execute a shutdown instruction of a user, and determining, according to a first startup mode determination result fed back by the application processor 1205, whether the first startup mode is enabled; and after receiving the shutdown instruction of the user, the application processor 1205 being further adapted to determine whether a current state of the terminal satisfies a preset first startup enabling condition; and if so, determine that the first startup mode is enabled; or otherwise, determine that the first startup mode is disabled, wherein the application processor 1205 feeds back a determination result to the communication processor 1204, so that the communication processor 1204 determines, according to the determination result, whether the first startup mode is enabled.

The first startup enabling condition of this embodiment includes the following: the startup signal is triggered not because a shutdown duration of a real-time clock interrupter reaches a predetermined shutdown upper limit; and the terminal is currently not connected to an external power supply; and the startup signal is triggered because the user triggers a power key and a duration in which the power key is triggered is longer than or equal to a predetermined duration; and the startup signal is triggered not because the user triggers a predetermined system update composite key.

Similar to that in Embodiment 2, the foregoing technical solution is further used to avoid energy consumption of the terminal caused by a long-time shutdown of the terminal, on the basis of facilitating applications for the user and increasing the quick startup speed of the user.

Embodiment 13

Figure 13:
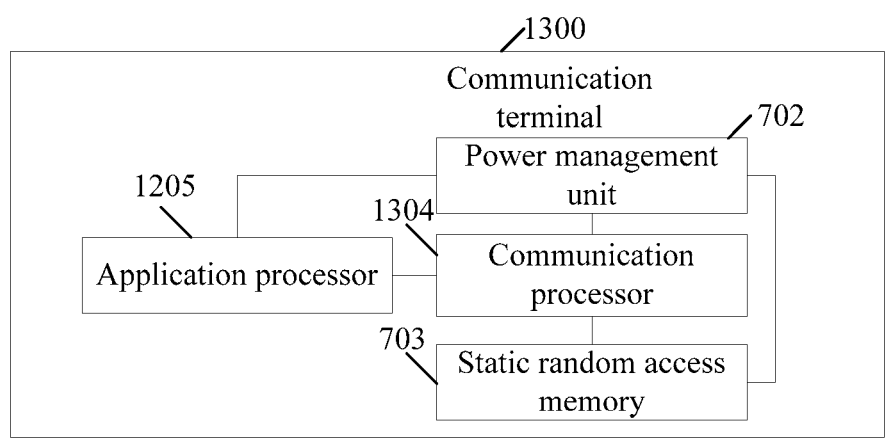
FIG. 13 is a schematic structural diagram of a communication terminal according to Embodiment 13 of the present invention.

Referring to FIG. 13, this embodiment provides a communication terminal 1300, which is different from the communication terminal in Embodiment 12 in that:

after supplying power to components of the terminal, and before the step of performing a startup according to a first startup mode, a communication processor 1304 is further adapted to: if the startup signal is triggered by the terminal itself because the shutdown duration of the terminal reaches a predetermined shutdown upper limit, control an application processor 1205 to determine whether the first startup mode of the communication processor is enabled; and if the first startup mode is disabled, control the shutdown duration to return to zero, cut off power of the components of the terminal, and stop the startup; or if the startup signal is triggered by a user, and the duration in which the power key is triggered is less than a predetermined duration, the communication processor 1304 may control the application processor 1205 to determine whether the first startup mode is enabled; and if the first startup mode is disabled, the communication processor 1304 is further adapted to cut off power of the components of the terminal, and stop the startup; or if the startup signal is triggered because the user triggers a predetermined system update composite key of the terminal, the communication processor 1304 may control the application processor 1205 to determine whether the first startup mode is enabled; and if the first startup mode is disabled, the communication processor 1304 is further adapted to recover a startup initial read address of the terminal to a default state, wherein the processor performs a system update process.

Similar to that in Embodiment 5, the technical solution is applied to help to improve compatibility between the technical solution of this embodiment and the terminal in the prior art, without changing the existing application habit of the user.

The described apparatus embodiment is merely exemplary. The units described as separate parts may or may not be physically separate, and parts displayed as units may or may not be physical units, may be located in one position, or may be distributed on a plurality of network units. A part or all of the modules may be selected according to actual needs to achieve the objectives of the solutions of the embodiments. A person of ordinary skill in the art may understand and implement the technical solutions of the present invention without any creative effort.

Through the descriptions of the foregoing embodiments, a person skilled in the art may understand that the present invention may be implemented by using hardware only or by using software and a necessary universal hardware platform. Based on such an understanding, the foregoing technical solutions essentially or the part contributing to the prior art may be embodied in the form of a software product. The software product may be stored in a storage medium such as a ROM/RAM, a magnetic disk, or an optical disc, and incorporate several instructions for instructing a computer device (for example, a personal computer, a server, or a network device or the like) to execute the method provided by each embodiment or certain parts of an embodiment of the present invention.

The foregoing embodiments do not constitute any limitation to the protection scope of the technical solutions. Any modification, equivalent replacement, or improvement made without departing from the spirit and principle of the present invention shall fall within the protection scope of the technical solutions.

What is claimed is:

1. A shutdown method, comprising:
   receiving, by a terminal, a shutdown instruction of a user, wherein the shutdown instruction of the user is used to instruct the terminal to perform a shutdown;
   determining whether a first shutdown mode is enabled; and
   when the first shutdown mode is enabled, performing a first shutdown according to the first shutdown mode, wherein, in the first shutdown mode, a static random access memory storing a recovery program of the terminal is in a power-on state, wherein the recovery program comprises current field information of the terminal, the current field information used for a communication processor to read and run the recovery program of the communication processor at a next startup of the terminal, so that the terminal is recovered to a state before a previous shutdown;
   when the first shutdown mode is disabled, performing a second shutdown according to a second shutdown mode, wherein, in the second shutdown mode, all components of the terminal are in a power-off state, wherein:
   the determining whether the first shutdown mode is enabled comprises:
   determining, whether a current state of the terminal satisfies a preset enabling condition; and
   when the current state of the terminal satisfies the preset enabling condition, determining that the first shutdown mode is enabled; and
   when the current state of the terminal dissatisfies the preset enabling condition, determining that the first shutdown mode is disabled, wherein:
   the preset enabling condition comprises the following:
   no universal serial bus is currently inserted into the terminal; a historical accumulative count of consecutive shutdowns performed by the terminal according to the first shutdown mode is less than a predetermined accumulative count upper limit an accumulative duration of shutdown processing of the consecutive shutdowns performed by the terminal according to the first shutdown mode is less than a predetermined accumulative duration upper limit; and an available subscriber identity module is installed in the terminal.

2. The shutdown method according to claim 1, wherein:
   the performing the first shutdown according to the first shutdown mode, comprises:
   storing state information of the communication processor and components controlled by the communication processor into a second memory, and keeping the second memory in a power-on state, so that the terminal is started according to the stored state information when the terminal is powered on and started, wherein the stored state information comprises system information and task information, and the components controlled by the communication processor comprise at least one application processor;
   storing the recovery program of the communication processor into the static random access memory, and keeping the static random access memory in the power-on state;
   re-mapping a storage address of the recovery program of the communication processor in the static random access memory, so that the storage address of the recovery program of the communication processor in the static random access memory is used as an initial read address of the processor when the terminal is powered on and started;
   cutting off, according to shutdown voting confirmation messages of voting sources corresponding to the communication processor, power of the communication processor and the voting sources, wherein the voting sources are the components controlled by the communication processor; and
   keeping an interrupt input end of a power management unit in an interrupt controller of the communication processor in an enabled state, keeping a pre-designated enabled interrupt input end in the interrupt controller of the communication processor in the enabled state, and controlling interrupt input ends other than the interrupt input end of the power management unit and the pre-designated enabled interrupt input end in the interrupt controller of the communication processor to be in a disabled state to enter a shutdown state;

controlling each interrupt input end in an interrupt controller of the at least one application processor to be in the disabled state.

3. The shutdown method according to claim 2, wherein:

when the voting sources corresponding to the communication processor comprise the at least one application processor, the cutting off, according to the shutdown voting confirmation messages of the voting sources corresponding to the communication processor, the power of the communication processor and the voting sources, comprises:

sending a shutdown voting notification to the at least one application processor;

sending, by the at least one application processor, the shutdown voting notification to corresponding shutdown voting sources;

receiving, by the at least one application processor, shutdown voting confirmation messages of the shutdown voting sources corresponding to each application processor, wherein the shutdown voting confirmation messages comprise: shutdown-allowed confirmation information;

after the at least one application processor receives the shutdown voting confirmation messages of all shutdown voting sources corresponding to each application processor, sending the shutdown voting confirmation messages to the communication processor;

powering off each of the application processors; and after the communication processor receives the shutdown voting confirmation messages of all the application processors, cutting off the power of the communication processor.

4. The shutdown method according to claim 2, wherein:

when the pre-designated enabled interrupt input end is null, the controlling the interrupt input ends other than the interrupt input end of the power management and the pre-designated enabled interrupt input end in the interrupt controller of the communication processor to be in the disabled state comprises:

keeping the interrupt input end of the power management unit in the enabled state, controlling a first real-time clock in the power management unit to be enabled, wherein an output end of the first real-time clock is connected to the interrupt input end of the power management unit, and controlling the interrupt input ends other than the interrupt input end of the power management unit in the interrupt controller of the communication processor to be in a disabled state;

when the pre-designated enabled interrupt input end is an interrupt input end of a real-time clock in the interrupt controller of the communication processor, the controlling the interrupt input ends other than the interrupt input end of the power management unit and the pre-designated enabled interrupt input end in the interrupt controller of the communication processor to be in the disabled state comprises:

keeping the interrupt input end of the power management unit and the interrupt input end of the real-time clock in the interrupt controller of the communication processor in an enabled state, wherein the interrupt input end of the real-time clock in the interrupt controller of the communication processor is used to control a second real-time clock connected to the interrupt input end of the real-time clock in the interrupt controller of the communication processor to be in the enabled state, wherein both of the first and the second real-time clocks are used to calculate a duration of a current shutdown of the terminal after the terminal enters the shutdown state and output a real-time clock interrupt when the duration of the current shutdown reaches a predetermined shutdown duration upper limit, wherein the real-time clock interrupt is used to control other interrupt input ends than the interrupt input end of the power management unit in the first interrupt controller to be in a disabled state.

5. A startup method, comprising:

receiving a startup signal, wherein the startup signal is used to trigger a terminal to perform a first startup; and supplying power to components of the terminal;

performing the first startup to the terminal according to a first startup mode; and if the startup according to the first startup mode fails, performing a second startup according to a second startup mode;

wherein, in the first startup mode, a communication processor of the terminal performs the first startup according to a pre-stored recovery program of the communication processor, and reads and runs the pre-stored recovery program of the communication processor to recover the communication processor to a state before a previous shutdown of the terminal, and in the second startup mode, the terminal reads and runs a boot program to perform the second startup, wherein:

the performing the first startup according to the first startup mode comprises:

reading and running the recovery program to recover the communication processor to the state before the previous shutdown of the terminal;

determining whether the first startup mode is enabled; and if the first startup mode is enabled, controlling each interrupt input end in an interrupt controller of the communication processor to be in an enabled state;

configuring system information of a subscriber identity module of the terminal as pre-stored system information of the subscriber identity module; and configuring communication parameters of the terminal according to current change information of the subscriber identity module of the terminal and the pre-stored system information of the subscriber identity module, so as to enter a startup state.

6. The startup method according to claim 5, wherein:

the determining whether the first startup mode is enabled comprises: determining whether a current state of the terminal satisfies a preset first startup enabling condition; and when the current state of the terminal satisfies the preset first startup enabling condition, determining that the first startup mode is enabled;

when the current state of the terminal dissatisfies the preset first startup, determining that the first startup mode is disabled; wherein the first startup enabling condition comprises a combination of the following conditions:

(a) the startup signal is triggered for any reason except the following two reasons: a shutdown duration of a real-time clock interrupter reaches a predetermined shutdown duration upper limit, and the user triggers a predetermined system update composite key;

(b) the terminal is currently not connected to an external power supply; and (c) the startup signal is triggered based on that a user triggers a power key and a duration in which the power key is triggered is longer than or equal to a predetermined duration.

7. The startup method according to claim 5, wherein:
after the step of supplying the power to the components of the terminal, and before the step of starting the terminal according to the first startup mode, the method further comprises:
when the startup signal is triggered by the terminal itself because the shutdown duration of the terminal reaches a predetermined shutdown upper limit, determining whether the first startup mode is enabled; and if the first startup mode is enabled, performing the first startup according to the first startup mode; if the first startup mode is disabled, controlling the shutdown duration to return to zero, cutting off the power of the components of the terminal, and not performing the first startup;
when the startup signal is triggered by the user, and the duration in which the power key is triggered is shorter than the predetermined duration, determining whether the first startup mode is enabled; and if the first startup mode is enabled, performing the first startup to the terminal according to the first startup mode; if the first startup mode is disabled, cutting off power of the components of the terminal, and not performing the first startup;
when the startup signal is triggered because the user triggers the predetermined system update composite key of the terminal, determining whether the first startup mode is enabled; and if the first startup mode is enabled, performing the first startup to the terminal according to the first startup mode; if the first startup mode is disabled, recovering a startup initial read address of the terminal to a default state, wherein the processor performs a system update process.

8. The startup method according to claim 5, wherein:
a plurality of configuring communication parameters of the terminal according to the current change information of the subscriber identity module of the terminal and the pre-stored system information of the subscriber identity module comprises:

(a) when no subscriber identity module is currently installed in the terminal, or an installed subscriber identity module is unavailable,
deleting, by the communication processor, the pre-stored system information of the subscriber identity module, and
notifying, by the communication processor, a network access service component that no subscriber identity module exists currently, so as to enter a startup state in which communication is unavailable;

(b) when an available subscriber identity module is currently installed in the terminal, and information of the subscriber identity module currently installed in the terminal is consistent with the pre-stored system information of the subscriber identity module,
sending, by the processor, the pre-stored system information of the subscriber identity module to the network access service component of the terminal, and
configuring, by the network access service component, the communication parameters of the terminal according to the pre-stored system information of the subscriber identity module, so as to enter the startup state in which communication is available; and (c) when a subscriber identity module is currently installed in the terminal, and the information of the subscriber identity module currently installed in the terminal is inconsistent with the pre-stored system information of the subscriber identity module,
initializing, by the processor, the currently installed subscriber identity module,
updating, by the processor, the system information of the subscriber identity module of the terminal from the pre-stored system information of the subscriber identity module to the information of the currently installed subscriber identity module,
sending, by the processor, the information of the currently installed subscriber identity module to the network access service component, and
configuring, by the network access service component, the communication parameters of the terminal according to the pre-stored system information of the subscriber identity module, so as to enter the startup state in which communication is available.

9. The startup method according to claim 5, wherein:
the terminal further comprises at least one application processor connected to the communication processor; and
after the step of recovering the communication processor to the state before the previous shutdown of the terminal, the method further comprises:
controlling, by the communication processor, each application processor to read and run a recovery program of each of the application processor, so as to recover each of the application processor to a state before the previous shutdown of the terminal, and
controlling, by the at least one application processor, each interrupt input end in an interrupt controller of each of the at least one application processor to be in an enabled state.

10. A communication terminal, comprising: a static random access memory and a communication processor, wherein,
the static random access memory is configured to store data under control of the communication processor, wherein the stored data comprises at least a pre-stored recovery program of the communication processor; and
the communication processor is configured to control components of the terminal, and perform a startup and shutdown of the terminal, wherein the startup comprises:
after a startup signal is received, performing a first startup according to a first startup mode, and if the first startup according to the first startup mode fails, performing a second startup according to a second startup mode, wherein, in the first startup mode, the terminal performs the first startup according to the pre-stored recovery program of the communication processor, and in the second startup mode, the terminal reads and runs a boot program to perform the second startup, wherein:
the communication processor is further configured to determine, after receiving a shutdown instruction of a user for instructing the terminal to perform the shutdown, whether a first shutdown mode is enabled; and if the first shutdown mode is enabled, shut down the terminal according to the first shutdown mode, wherein, in the first shutdown mode, the static random access memory of the terminal is in a power-on state, wherein:

the communication processor determining whether the first shutdown mode is enabled comprises:

determining, whether a current state of the terminal satisfies a preset enabling condition; and if the current state of the terminal satisfies the preset enabling condition, determining that the first shutdown mode is enabled; if the current state of the terminal does not satisfy the preset enabling condition, determining that the first shutdown mode is disabled, wherein:

the preset enabling condition comprises the following:

no universal serial bus is currently inserted into the terminal; and a historical accumulative count of consecutive shutdowns performed by the terminal according to the first shutdown mode is less than a predetermined accumulative count upper limit; and an accumulative duration of shutdown processing of the consecutive shutdowns performed by the terminal according to the first shutdown mode is less than a predetermined accumulative duration upper limit; and an available subscriber identity module is currently installed in the terminal.

11. The communication terminal according to claim 10, wherein:

the communication processor shutting down the terminal according to the first shutdown mode comprises:

storing state information of the communication processor and components controlled by the communication processor into a second memory, and keep the second memory in the power-on state, so that the terminal is started according to the stored state information when the terminal is powered on and started, wherein the state information comprises system information and task information, and the components controlled by the communication processor comprise at least one application processor;

storing the recovery program of the communication processor into the static random access memory, and keep the static random access memory in the power-on state;

re-mapping a storage address of the recovery program of the communication processor in the static random access memory, so that the storage address of the recovery program of the communication processor in the static random access memory is used as an startup initial read address of the communication processor when the terminal is powered on and started;

keeping an interrupt input end of power management in an interrupt controller of the communication processor in an enabled state, keep a pre-designated enabled interrupt input end in the interrupt controller of the communication processor in the enabled state, and control interrupt input ends other than the interrupt input end of the power management unit and the pre-designated enabled interrupt input end in the interrupt controller of the communication processor to be in a disabled state to enter a shutdown state; and controlling each interrupt input end in an interrupt controller of the at least one application processor to be in a disabled state; and cutting off, according to shutdown voting confirmation messages of voting sources corresponding to the communication processor, power of the communication processor and the voting sources, wherein the voting sources are the components controlled by the communication processor.

12. The communication terminal according to claim 10, wherein:

the communication processor performing the first startup according to a first startup mode comprises:

reading and running the recovery program to recover the communication processor to a state before a previous shutdown of the terminal; and when the first startup mode is enabled, controlling each interrupt input end in an interrupt controller of the communication processor to be in an enabled state, configuring system information of a subscriber identity module of the terminal as pre-stored system information of the customer identity module, and configuring communication parameters of the terminal according to current change information of a customer identity module of the terminal and the pre-stored system information of the customer identity module, so as to enter a startup state.

13. The communication terminal according to claim 12, wherein:

the communication processor determining whether the first startup mode is enabled comprises:

instructing the at least one application processor to execute the shutdown instruction of the user, and determine, according to a determination result of the first startup mode fed back by the at least one application processor, whether the first startup mode is enabled; and after receiving the shutdown instruction of the user, the at least one application processor further determining whether a current state of the terminal satisfies a preset first startup enabling condition; and if the current state of the terminal satisfies the preset first startup enabling condition, determining that the first startup mode is enabled; if the current state of the terminal does not satisfy the preset first startup enabling condition, determining that the first startup mode is disabled; wherein the first startup enabling condition comprises a combination of the following conditions:

(a) the startup signal is triggered for any reason except the following two reasons: a shutdown duration of a real-time clock interrupter reaches a predetermined shutdown duration upper limit, and the user triggers a predetermined system update composite key;

(b) the terminal is currently not connected to an external power supply; and (c) the startup signal is triggered based on that a user triggers a power key and a duration in which the power key is triggered is longer than or equal to a predetermined duration.

14. The communication terminal according to claim 13, wherein:

after supplying power to components of the terminal, and before performing the first startup according to the first startup mode, the communication processor is further configured to:

when the startup signal is triggered by the terminal itself because the shutdown duration of the terminal reaches the predetermined shutdown upper limit, determine whether the first startup mode is enabled; and if the first startup mode is disabled, control the shutdown duration to return to zero, cut off power of the components of the terminal, and not performing the first startup;

when the startup signal is triggered by the user, and the duration in which the power key is triggered is shorter than the predetermined duration, determine whether the first startup mode is enabled; and if the first startup mode is disabled, cut off power of the components of the terminal, and stop the startup;

when the startup signal is triggered because the user triggers the predetermined system update composite key, determine whether the first startup mode is enabled; and if the first startup mode is disabled, recover a startup initial read address of the terminal to a default state, wherein the processor performs a system update process.

* * * * *